(12) United States Patent
Rockman et al.

(10) Patent No.: US 10,345,542 B2
(45) Date of Patent: Jul. 9, 2019

(54) OPTO-MECHANICAL COUPLER

(71) Applicant: Mellanox Technologies, Ltd., Yokneam (IL)

(72) Inventors: Sylvie Rockman, Zichron Yaakov (IL); Yaakov Gridish, Yoqneam Ilit (IL); Pierre Avner Badehi, Yehuda (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 15/280,266

(22) Filed: Sep. 29, 2016

(65) Prior Publication Data
US 2017/0371115 A1    Dec. 28, 2017

Related U.S. Application Data

(63) Continuation-in-part of application No. 15/195,538, filed on Jun. 28, 2016.

(51) Int. Cl.
| | |
|---|---|
| *G02B 6/42* | (2006.01) |
| *G02B 6/32* | (2006.01) |
| *G02B 6/36* | (2006.01) |
| *G02B 6/43* | (2006.01) |

(52) U.S. Cl.
CPC ......... *G02B 6/4243* (2013.01); *G02B 6/3652* (2013.01); *G02B 6/423* (2013.01); *G02B 6/4204* (2013.01); *G02B 6/4214* (2013.01); *G02B 6/4246* (2013.01); *G02B 6/43* (2013.01); *G02B 6/428* (2013.01)

(58) Field of Classification Search
CPC .......... G02B 6/42; G02B 6/32; G02B 6/4246
USPC ........................................................... 385/31
See application file for complete search history.

(56) References Cited

U.S. PATENT DOCUMENTS

| | | | | |
|---|---|---|---|---|
| 4,165,914 A | * | 8/1979 | Villarruel | G02B 6/3636 385/44 |
| 4,750,799 A | * | 6/1988 | Kawachi | G02B 6/12004 385/14 |

(Continued)

FOREIGN PATENT DOCUMENTS

EP    2 546 688 A1    1/2013

OTHER PUBLICATIONS

Monroy, I. T. et al., Data Transmission Over Polymer Optical Fibers, Optical Fiber Technology 9 (2003) 159-171.

(Continued)

*Primary Examiner* — Kaveh C Kianni
(74) *Attorney, Agent, or Firm* — Alston & Bird LLP

(57) ABSTRACT

An opto-mechanical coupler and corresponding method of manufacture are provided. The coupler may include a body defining a bottom surface, a receiving surface, and a reflective surface. The reflective surface may redirect optical signals between a first direction and a second direction. The receiving surface may position one or more optical fibers along the second direction such that an optical signal from the plurality of optoelectronic transceivers may be directed into the one or more optical fibers or an optical signal received from the one or more optical fibers may be directed into the plurality of the optoelectronic transceivers. The receiving surface may also define grooves to locate each optical fiber at a height relative to a first optical path in the second direction.

18 Claims, 19 Drawing Sheets

(56) References Cited

U.S. PATENT DOCUMENTS

| | | | | |
|---|---|---|---|---|
| 5,479,540 | A * | 12/1995 | Boudreau | G02B 6/4231 385/14 |
| 5,555,333 | A * | 9/1996 | Kato | G02B 6/4214 385/83 |
| 6,415,076 | B1 | 7/2002 | DeCusatis | |
| 6,456,766 | B1 * | 9/2002 | Shaw | G02B 6/30 385/47 |
| 7,217,043 | B2 | 5/2007 | Schunk | |
| 7,287,914 | B2 * | 10/2007 | Fujiwara | G02B 6/4214 385/52 |
| 7,460,753 | B2 | 12/2008 | Kewitsch | |
| 9,322,704 | B1 | 4/2016 | Neveux, Jr. | |
| 9,429,725 | B2 * | 8/2016 | Shao | H04B 10/40 |
| 9,547,142 | B1 * | 1/2017 | Chen | G02B 6/4286 |
| 9,588,301 | B2 * | 3/2017 | Bylander | G02B 6/4214 |
| 2002/0126948 | A1 * | 9/2002 | Lim | G02B 6/3514 385/17 |
| 2002/0131727 | A1 * | 9/2002 | Reedy | G02B 6/4214 385/88 |
| 2002/0164113 | A1 * | 11/2002 | Rensing | G02B 6/3586 385/18 |
| 2003/0113077 | A1 * | 6/2003 | Xu | G02B 6/4204 385/93 |
| 2003/0118294 | A1 * | 6/2003 | Korenaga | G02B 6/12007 385/92 |
| 2003/0161595 | A1 * | 8/2003 | Dallas | G02B 6/255 385/96 |
| 2003/0190113 | A1 * | 10/2003 | Huang | G02B 6/3586 385/18 |
| 2004/0017977 | A1 * | 1/2004 | Lam | G02B 6/4204 385/49 |
| 2004/0022487 | A1 * | 2/2004 | Nagasaka | G02B 6/4204 385/31 |
| 2004/0126118 | A1 * | 7/2004 | Lo | G02B 6/4206 398/139 |
| 2004/0202477 | A1 * | 10/2004 | Nagasaka | G02B 6/4214 398/138 |
| 2005/0123246 | A1 * | 6/2005 | Morse | H01S 3/06704 385/53 |
| 2005/0180698 | A1 * | 8/2005 | Hauffe | G02B 6/4201 385/88 |
| 2006/0104576 | A1 * | 5/2006 | Nagasaka | G02B 6/32 385/93 |
| 2007/0133928 | A1 * | 6/2007 | Ko | G02B 6/4215 385/88 |
| 2007/0140628 | A1 * | 6/2007 | Ebbutt | G02B 6/3644 385/89 |
| 2007/0230872 | A1 * | 10/2007 | Suzuki | G02B 6/4214 385/48 |
| 2008/0226228 | A1 * | 9/2008 | Tamura | G02B 6/4214 385/33 |
| 2008/0247713 | A1 * | 10/2008 | Tamura | G02B 6/4206 385/93 |
| 2009/0252503 | A1 * | 10/2009 | Ishigami | G02B 6/4246 398/200 |
| 2009/0285533 | A1 * | 11/2009 | Hiroi | G02B 6/3636 385/65 |
| 2010/0135618 | A1 * | 6/2010 | Howard | G02B 6/3829 385/79 |
| 2012/0263416 | A1 * | 10/2012 | Morioka | G02B 6/4214 385/33 |
| 2012/0315478 | A1 | 12/2012 | Naritomi et al. | |
| 2013/0259431 | A1 * | 10/2013 | Charbonneau-Lefort | G02B 6/4214 385/89 |
| 2014/0056560 | A1 * | 2/2014 | McColloch | G02B 6/3879 385/59 |
| 2014/0064666 | A1 * | 3/2014 | McColloch | G02B 6/3839 385/71 |
| 2014/0079357 | A1 * | 3/2014 | McColloch | G02B 6/3839 385/92 |
| 2014/0086528 | A1 * | 3/2014 | Yonezawa | G02B 6/4214 385/33 |
| 2014/0099058 | A1 * | 4/2014 | Charbonneau-Lefort | G02B 6/4214 385/33 |
| 2014/0193116 | A1 * | 7/2014 | Bylander | G02B 6/4214 385/33 |
| 2014/0193124 | A1 * | 7/2014 | Bylander | G02B 6/4214 385/93 |
| 2015/0050019 | A1 * | 2/2015 | Sengupta | H04J 14/04 398/44 |
| 2015/0117824 | A1 * | 4/2015 | Wang | G02B 6/32 385/93 |
| 2015/0268425 | A1 * | 9/2015 | de Jong | G02B 6/4214 385/33 |
| 2016/0209610 | A1 * | 7/2016 | Kurtz | G02B 6/4292 |
| 2016/0231513 | A1 * | 8/2016 | Butler | G02B 6/421 |
| 2017/0064031 | A1 * | 3/2017 | Sunay | H04L 67/303 |

OTHER PUBLICATIONS

Toma, T. et al., Development of WDM Optical Transmission System Over GI-POF Pair Cable for Television RF, Gigabit-Ethernet, and HDMI/DVI, E-Lambdanet (2014) 5 pages.

Ziemann, O. et al., POF Handbook: Optical Short Range Transmission Systems, 2nd Ed., Springer (2008) 901 pages.

Office Action for U.S. Appl. No. 15/195,538 dated Mar. 17, 2017, 13 pages.

Office Action for U.S. Appl. No. 15/195,538 dated Sep. 25, 2017, 11 pages.

* cited by examiner

OPTO-MECHANICAL COUPLER

CROSS REFERENCE TO RELATED APPLICATIONS

This application is a continuation-in-part of U.S. application Ser. No. 15/195,538, filed Jun. 28, 2016, and entitled "OPTO-MECHANICAL COUPLER", which application is incorporated by reference herein in its entirety.

FIELD OF THE INVENTION

The present disclosure relates generally to optoelectronic interfaces for transmitting optical signals through fiber optic cable systems and, more particularly, to apparatuses and associated methods of coupling fiber optic cables with optoelectronic transceiver assemblies for transmitting optical signals via fiber optic cables.

BACKGROUND OF THE INVENTION

Optical fibers are thin filaments cladded in a material with a low index of refraction capable of transmitting optical signals. Various types of optical fibers are present in the art including plastic/polymer optical fiber (POF), single mode optical fiber (SMF), and multi-mode optical fiber (MMF). Traditionally, POFs are comprised of thin plastic or polymer fibers and are often utilized in short distance applications. Conversely, SMFs are comprised of thin glass fibers and are often utilized in longer distance and high speed applications. MMFs are configured similarly to SMFs, but are designed to carry multiple modes of optical signals at the same time, each signal being transmitted at a slightly different reflection angle. Unlike SMFs, which can carry optical signals over long distances, MMFs are typically used for shorter transmission distances.

Due to their smaller diameter, SMFs must be positioned with a higher degree of accuracy than POFs or MMFs. Conventional systems require expensive and time consuming active alignment devices that hold the fibers with ferrules and calibrate the SMF into alignment.

Optical fibers may thus serve as the transmission media for optical signals generated by optoelectronic transceivers. For example, optical fibers are often used in conjunction with various types of light-emitting components, which generate the optical signal based on an electrical input for transmission through the fibers. Often, for example, vertical-cavity surface-emitting lasers (VCSELs) are used to emit light through the fiber optic cables. Other sources of light include edge emitting lasers, edge emitting silicon phontoics components, collimated VCSELs, lens integrated surface emitting lasers (LISELs), and other sources.

Applicant has identified a number of deficiencies and problems associated with conventional optical fiber couplers, interfaces, and other associated systems. Through applied effort, ingenuity, and innovation, many of these identified problems have been solved by developing solutions that are included in embodiments of the present invention, many examples of which are described in detail herein.

BRIEF SUMMARY OF THE INVENTION

Opto-mechanical couplers are therefore herein described that are configured to accommodate multiple fibers of different types (e.g., different fiber diameters) without requiring major system modification.

In one embodiment, an opto-mechanical coupler is provided that includes a body defining a first end and a second end, wherein the first end is configured to receive one or more optical fibers. The coupler further includes a bottom surface supporting a plurality of optical lenses, with the optical lenses configured to allow passage of optical signals traveling in a first direction for transmission to or from a plurality of optoelectronic transceivers disposed proximate the bottom surface. The coupler may further include a top surface opposite the bottom surface.

The body defines at least one through-hole extending between the top surface and the bottom surface, and the through-hole is configured to receive a pin therethrough. The coupler further includes a reflective surface configured to redirect the optical signals between the first direction and a second direction. The coupler may thus be configured to position the one or more optical fibers along the second direction such that an optical signal from the plurality of optoelectronic transceivers is directed into the one or more optical fibers or an optical signal received from the one or more optical fibers is directed into the plurality of the optoelectronic transceivers.

In some cases, the first end may define grooves configured to locate each optical fiber at a height relative to a first optical path in the second direction. The first end may be configured to receive a first set of one or more optical fibers having a first diameter, and the second end may be configured to receive a second set of one or more optical fibers having a second diameter. In this regard, the first diameter and the second diameter are not equal. The first end may define grooves configured to locate each optical fiber at a height relative to a first optical path in the second direction, and the second end may define grooves configured to locate each optical fiber at a second height relative to a second optical path in the second direction, where the first height and the second height are not equal.

The first end, in some cases, may further comprise an aperture configured to receive an optical fiber, and the aperture may define a distal diameter and a proximal diameter, with the proximal diameter being smaller than the distal diameter. In some cases, the one or more optical fibers may be plastic optical fibers or single mode (or multi-mode) optical fibers. Moreover, the coupler may be configured to receive optical signals having a nominal wavelength of 1310 nm.

In other embodiments, an opto-mechanical coupler is provided that includes a body defining a first end and a second end, wherein the first end comprises an aperture configured to receive one or more optical fibers, and wherein the aperture defines a distal diameter and a proximal diameter, the proximal diameter being smaller than the distal diameter. The coupler further includes a bottom surface configured to support a plurality of optical lenses, wherein the optical lenses are configured to allow passage of optical signals traveling in a first direction for transmission to or from a plurality of optoelectronic transceivers disposed proximate the bottom surface, and further includes a top surface opposite the bottom surface. The coupler also includes a reflective surface configured to redirect the optical signals between the first direction and a second direction. The aperture is configured such that the one or more optical fibers may be inserted into the aperture a distance based on the diameter of the one or more optical fibers. Moreover, the one or more optical fibers are positioned such that an optical signal traveling in the second direction from the plurality of optoelectronic transceivers is directed via the reflective surface into the one or more optical fibers or an optical signal from the one or more optical fibers is directed via the reflective surface into the plurality of the optoelectronic transceivers.

In some cases, the aperture may define a first distance in the second direction having a constant diameter and a second distance in the second direction, wherein the diameter of the aperture over the second distance is tapered between the distal diameter and the proximal diameter. The one or more optical fibers may be plastic optical fibers or single mode optical fibers, and the coupler may be configured to receive optical signals having a nominal wavelength of 1310 nm.

In still other embodiments, a method of manufacturing opto-mechanical couplers is also provided, where the method includes forming a body defining a first end, a second end, a bottom surface, a top surface, and a reflective surface, as described above. At least one aperture may be defined proximate the first end, wherein the aperture is configured to receive one or more optical fibers. A plurality of optical lenses may be supported via the bottom surface of the body, with the optical lenses configured to allow passage of optical signals traveling in a first direction for transmission to or from a plurality of optoelectronic transceivers disposed proximate the bottom surface. As described above, at least one through-hole may be defined extending between the top surface and the bottom surface, and the through-hole may be configured to receive a pin therethrough. The reflective surface may be configured to redirect the optical signals between the first direction and a second direction. In this way, the coupler may be configured to position the one or more optical fibers along the second direction such that an optical signal from the plurality of optoelectronic transceivers is directed into the one or more optical fibers or an optical signal received from the one or more optical fibers is directed into the plurality of the optoelectronic transceivers.

In some cases, as described above, the apertures of the first end may comprise grooves configured to locate each optical fiber at a height relative to a first optical path in the second direction. The first end may be configured to receive via the apertures a first set of one or more optical fibers having a first diameter. In some embodiments, the method may further comprise defining additional apertures proximate the second end, where the additional apertures are configured to receive a second set of one or more optical fibers having a second diameter. In this regard, the first diameter and the second diameter are not equal, such that fibers having different diameters may be received by a respective end and apertures of the coupler.

In some cases, the apertures of the first end may comprise grooves configured to locate each optical fiber at a height relative to a first optical path in the second direction, and the apertures of the second end may comprise grooves configured to locate each optical fiber at a second height relative to a second optical path in the second direction, wherein the first height and the second height are not equal. Each aperture of the first end may define a distal diameter and a proximal diameter, and the proximal diameter may be smaller than the distal diameter.

The one or more optical fibers may be plastic optical fibers or single mode (or multi-mode) optical fibers, and the coupler may be configured to receive optical signals having a nominal wavelength of 1310 nm.

BRIEF DESCRIPTION OF THE SEVERAL VIEWS OF THE DRAWINGS

Figure 1:
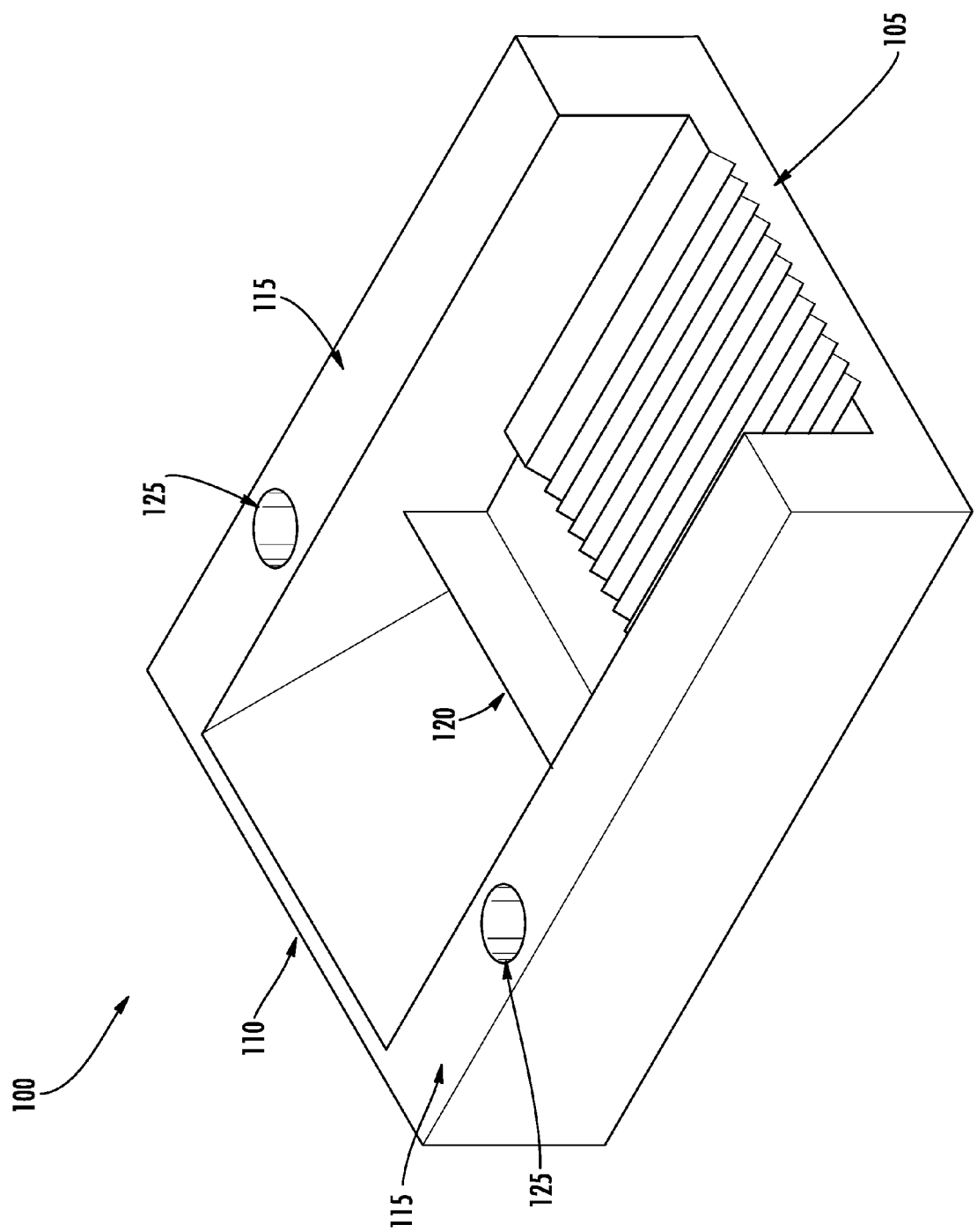
Figure 2:
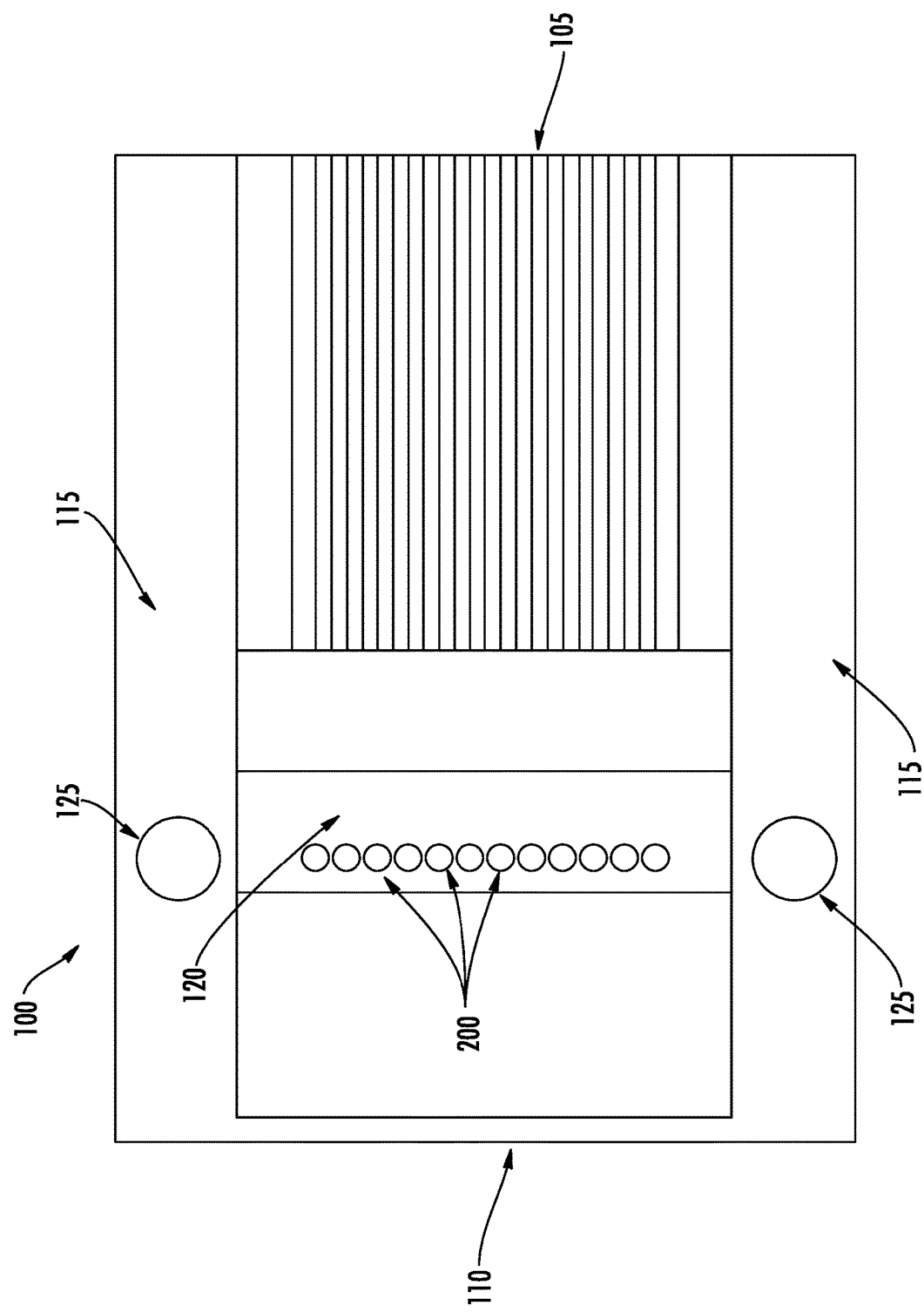
Figure 3:
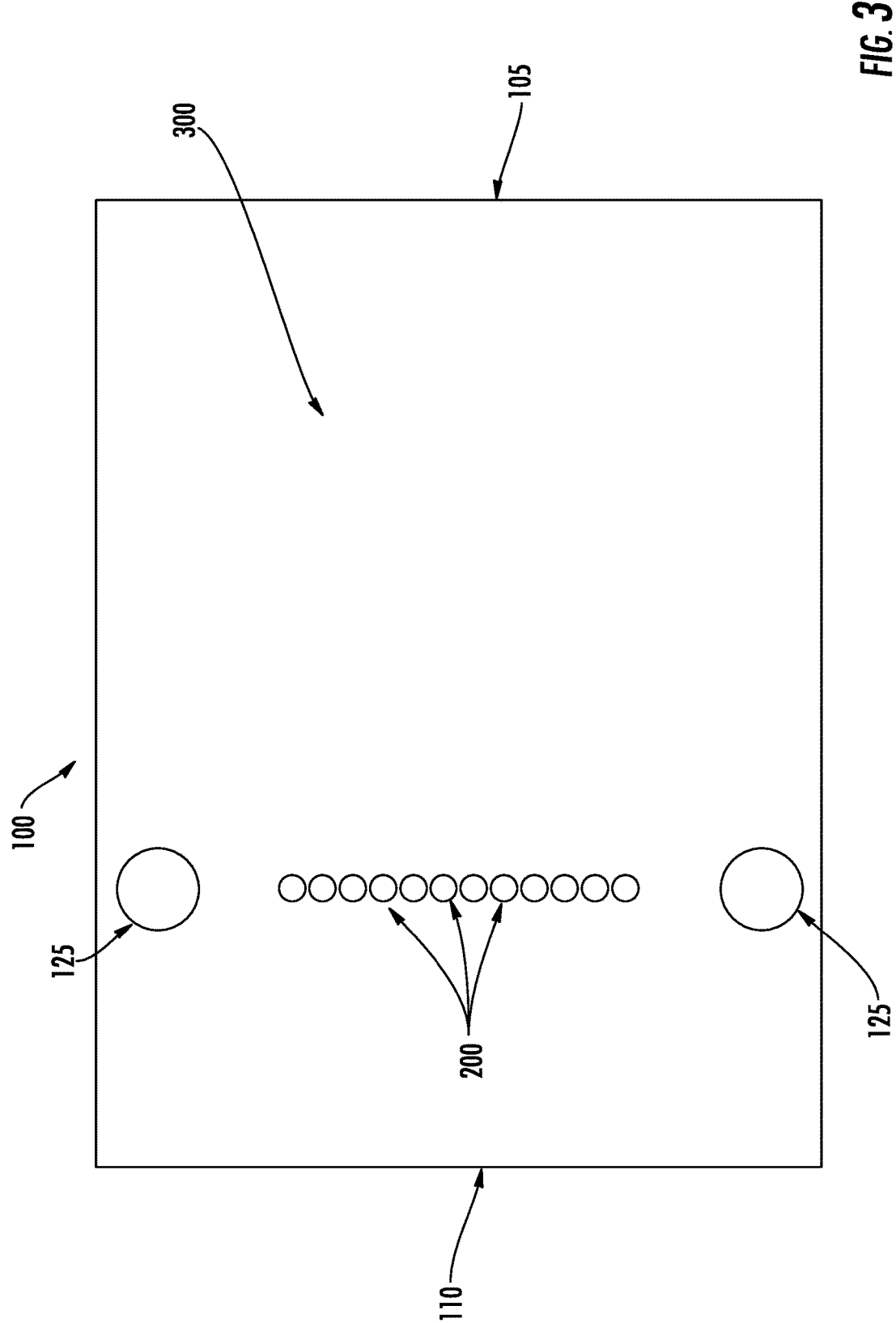
Figure 4:
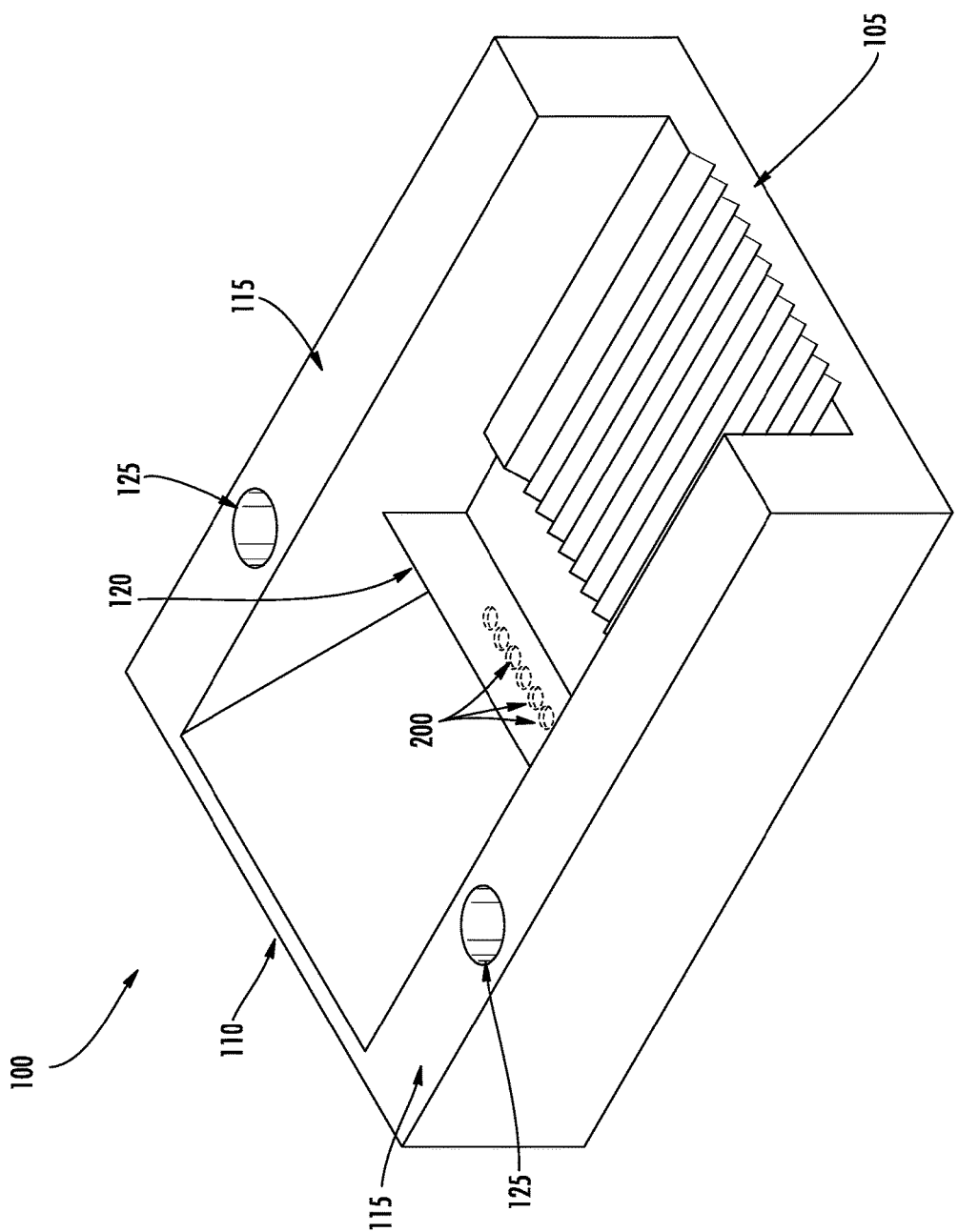
Figure 5:
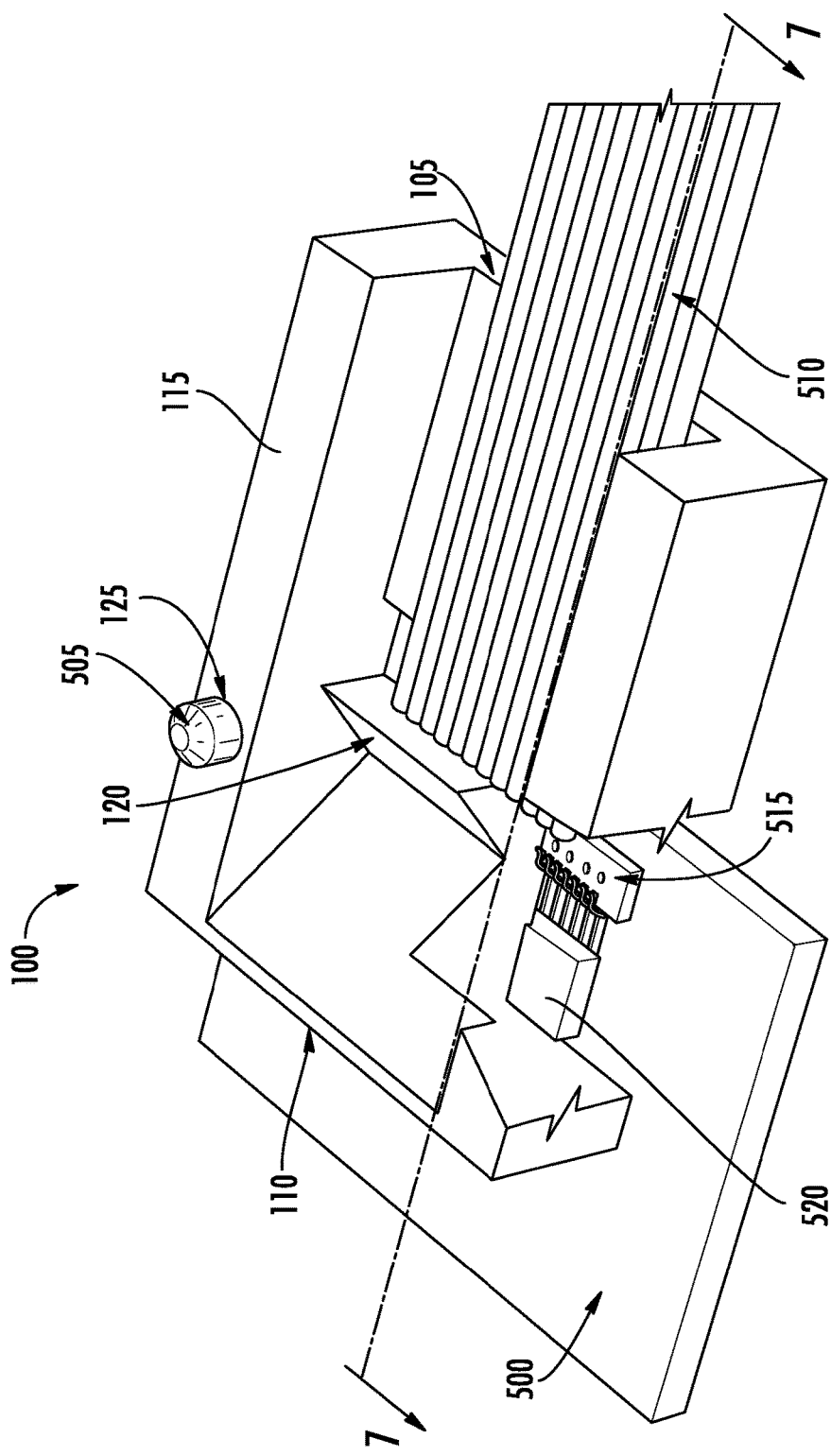
Figure 6:
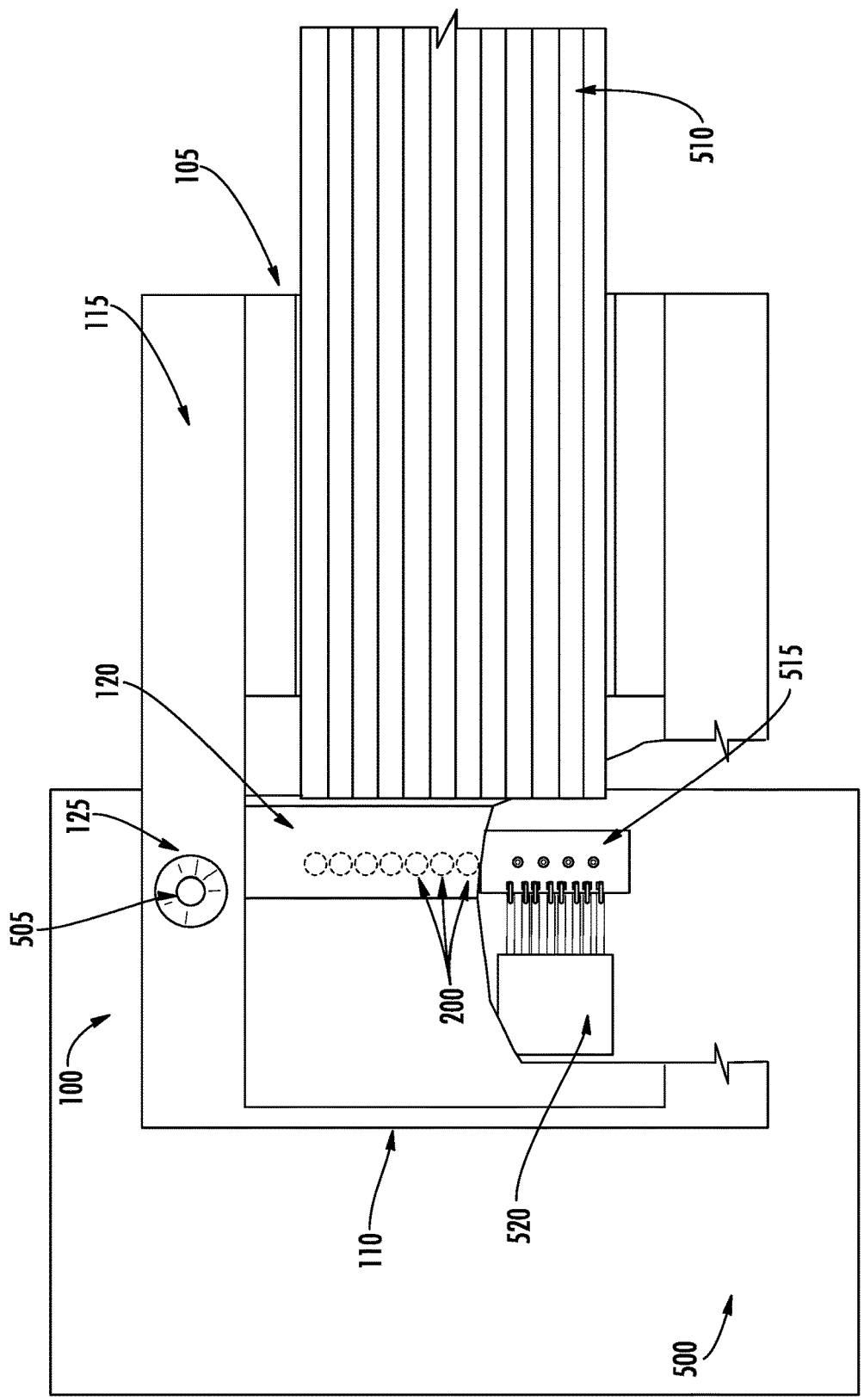
Figure 7:
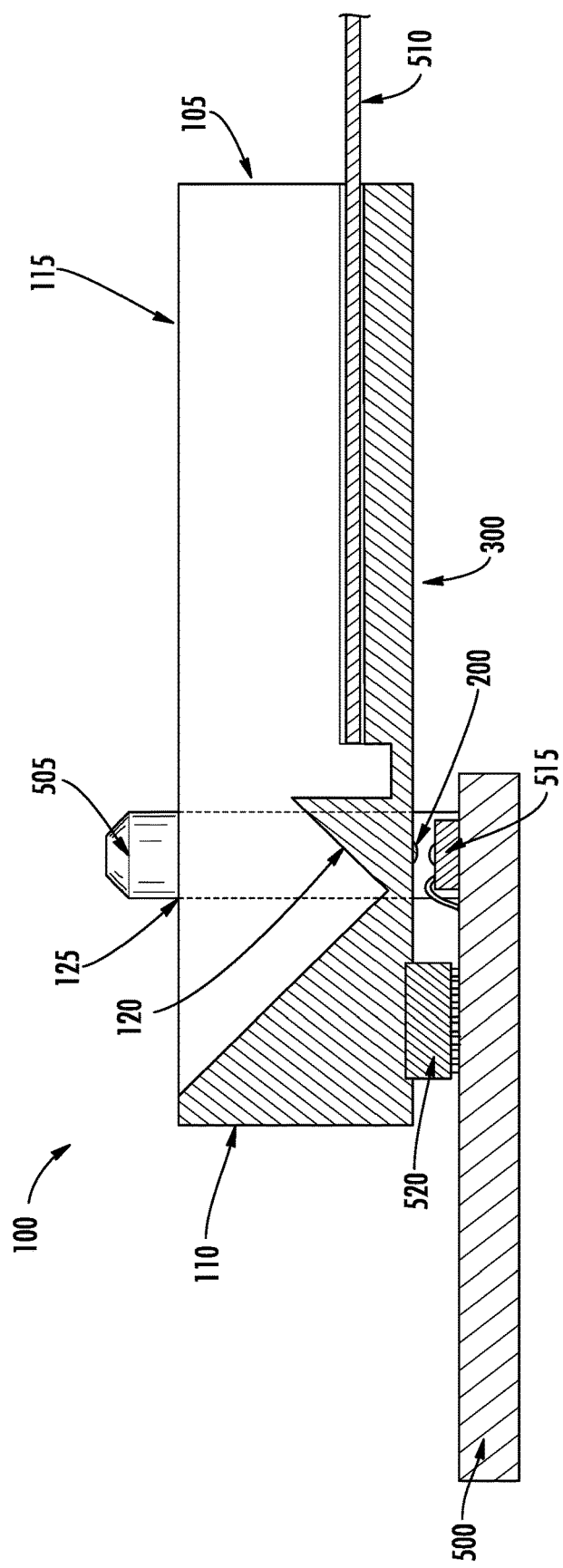
Figure 8:
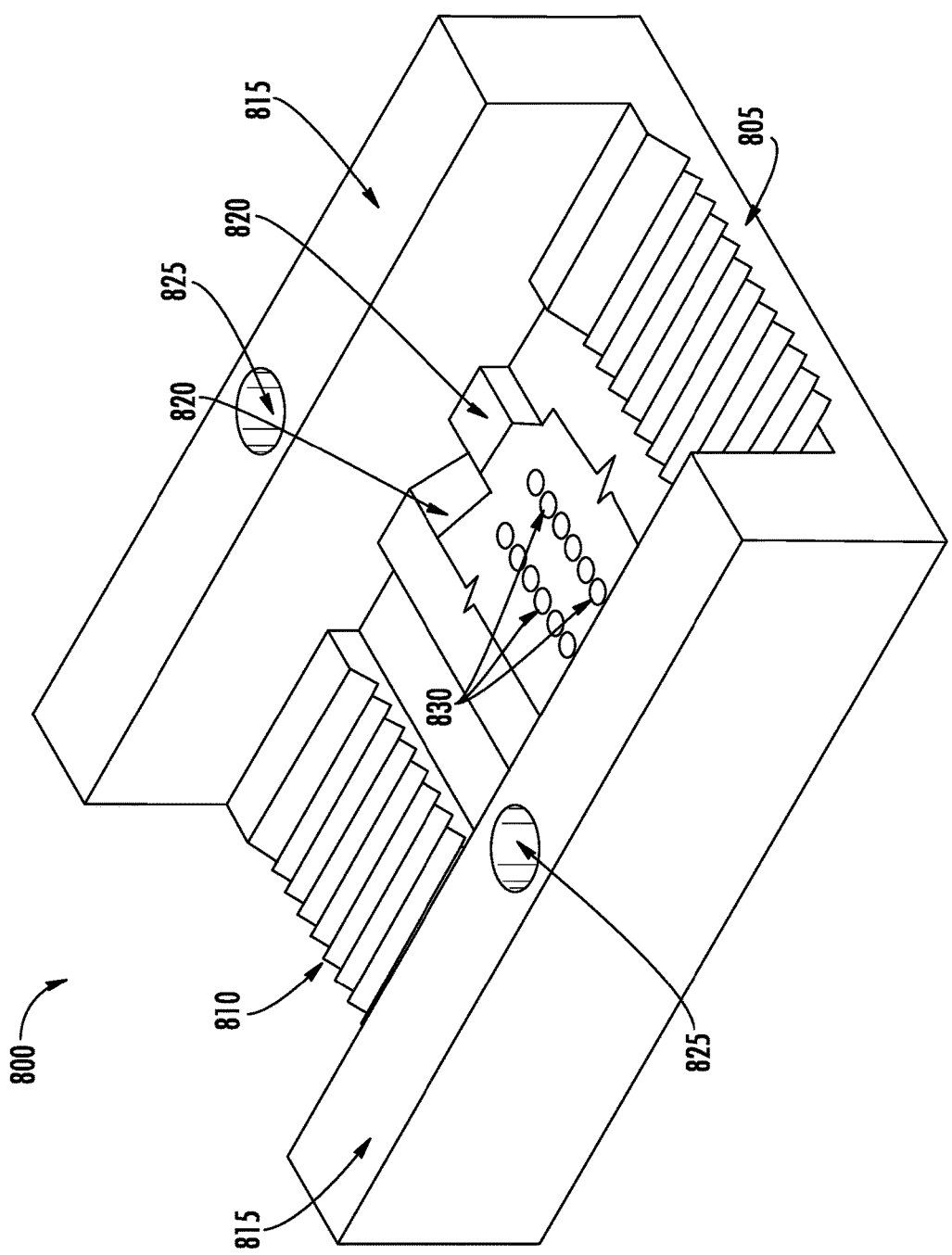
Figure 9:
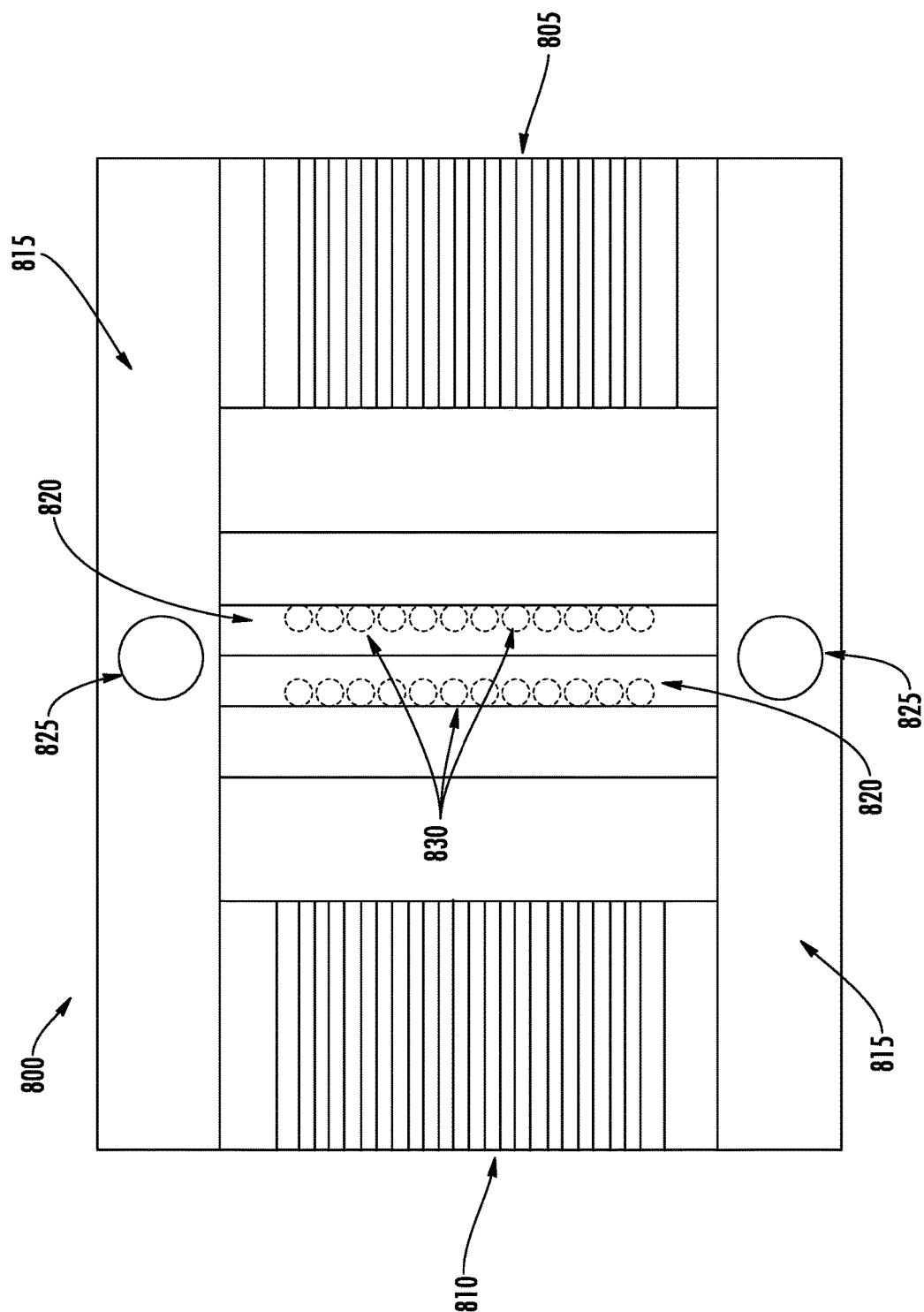
Figure 10:
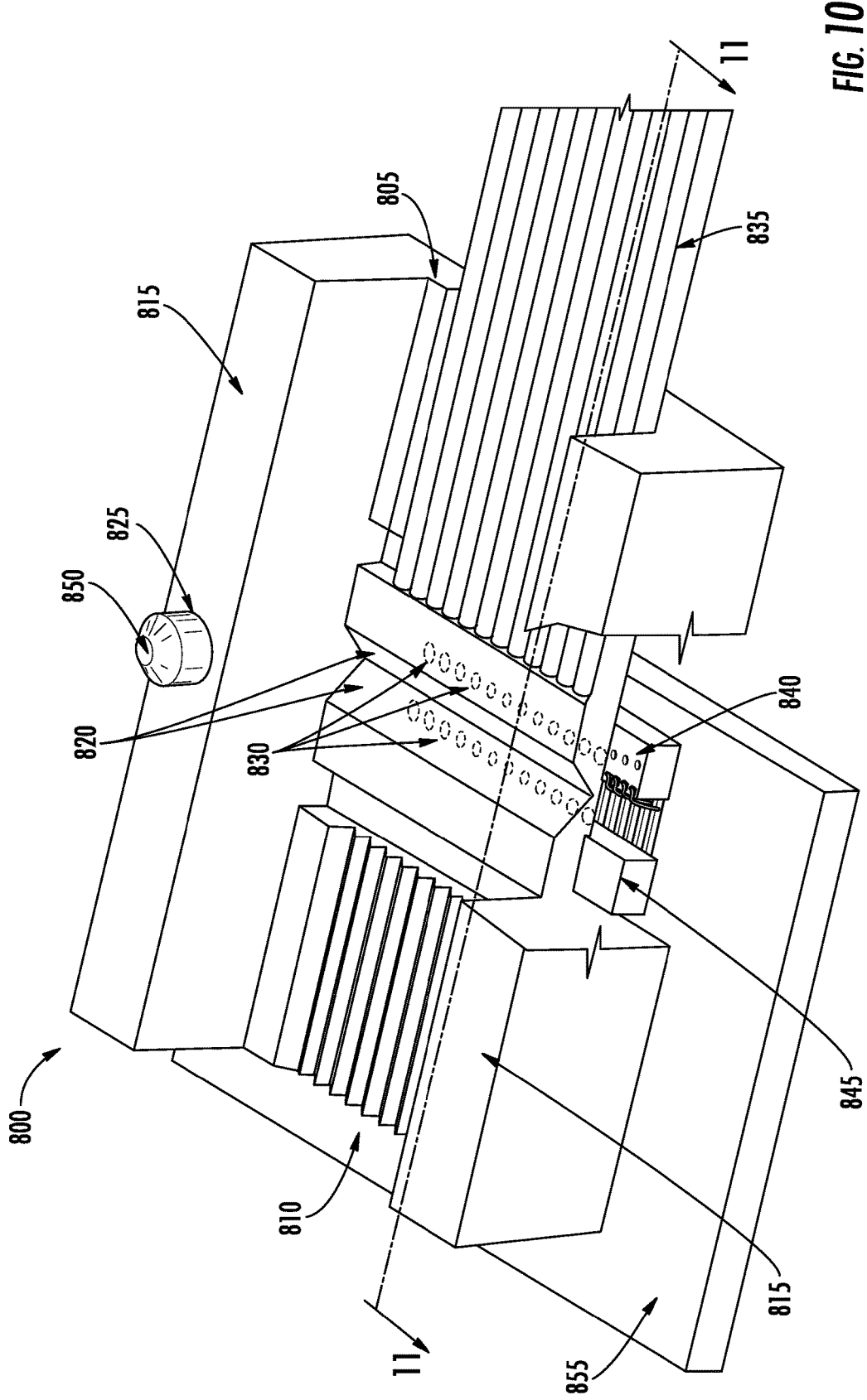
Figure 11:
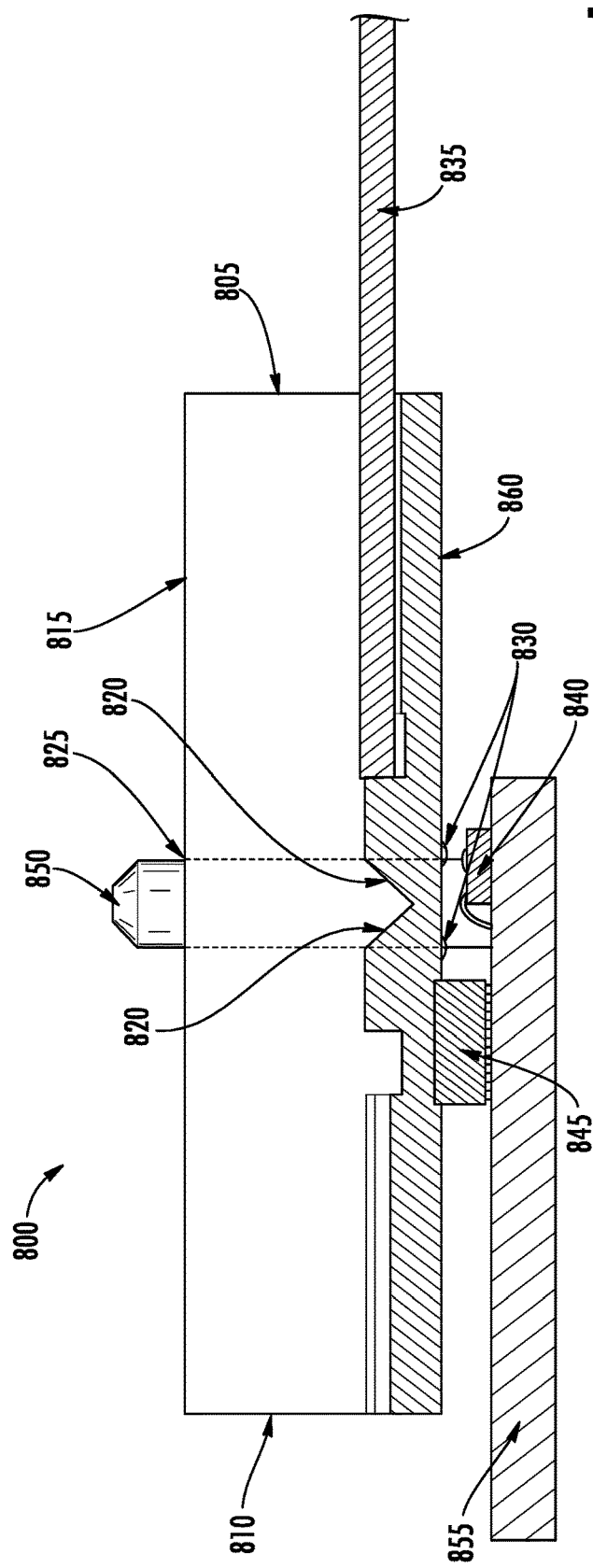
Figure 12:
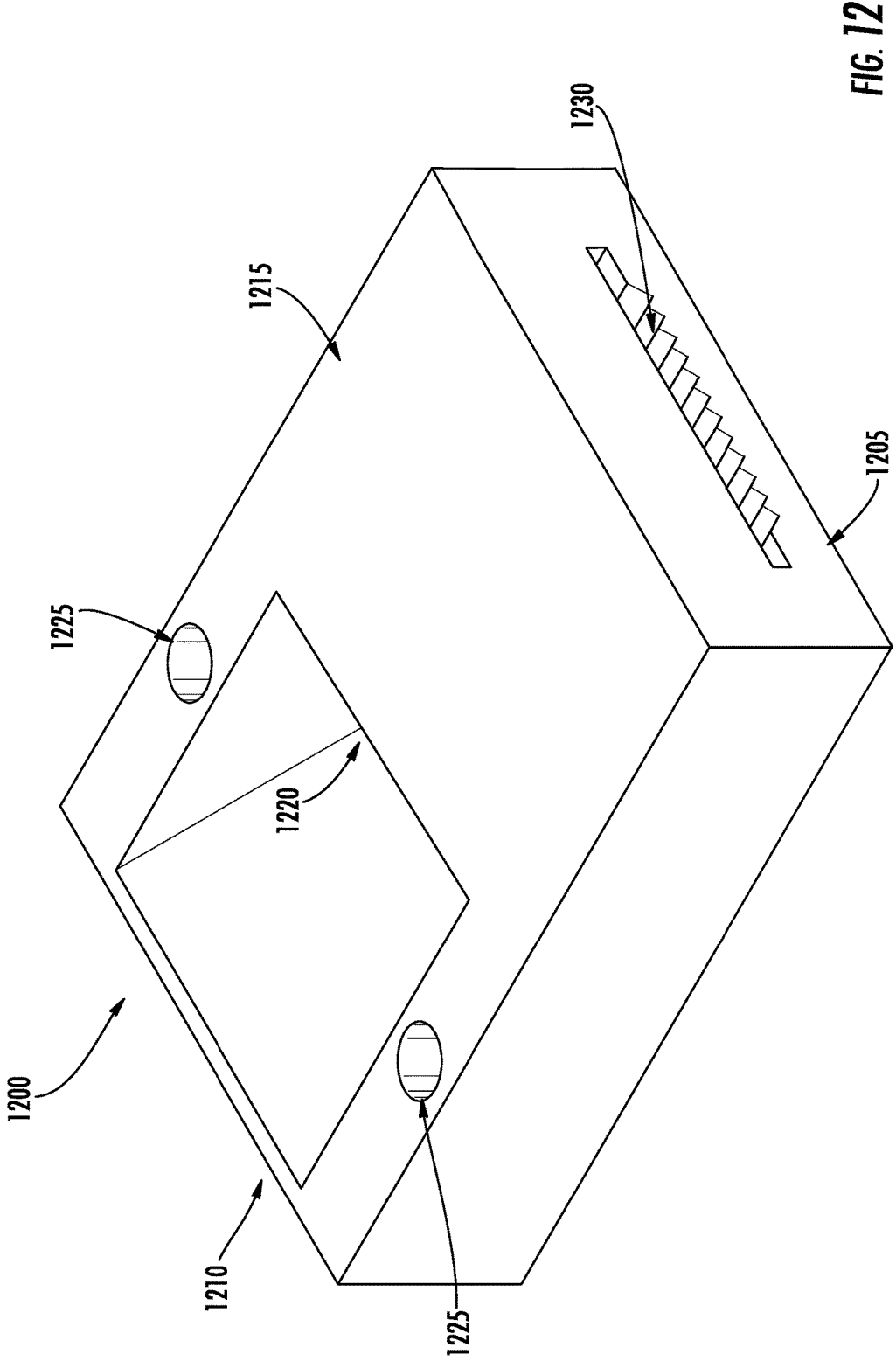
Figure 13:
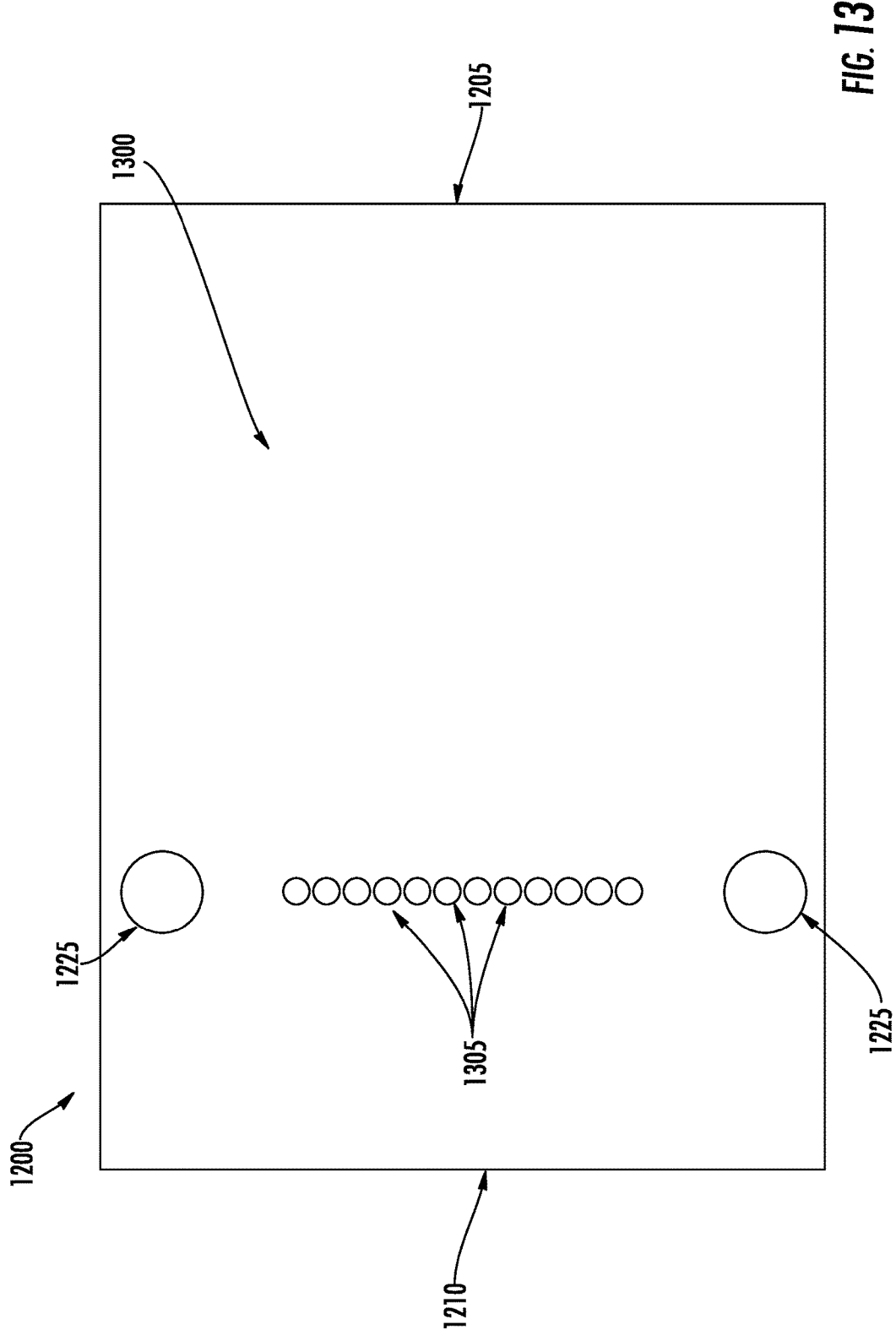
Figure 14:
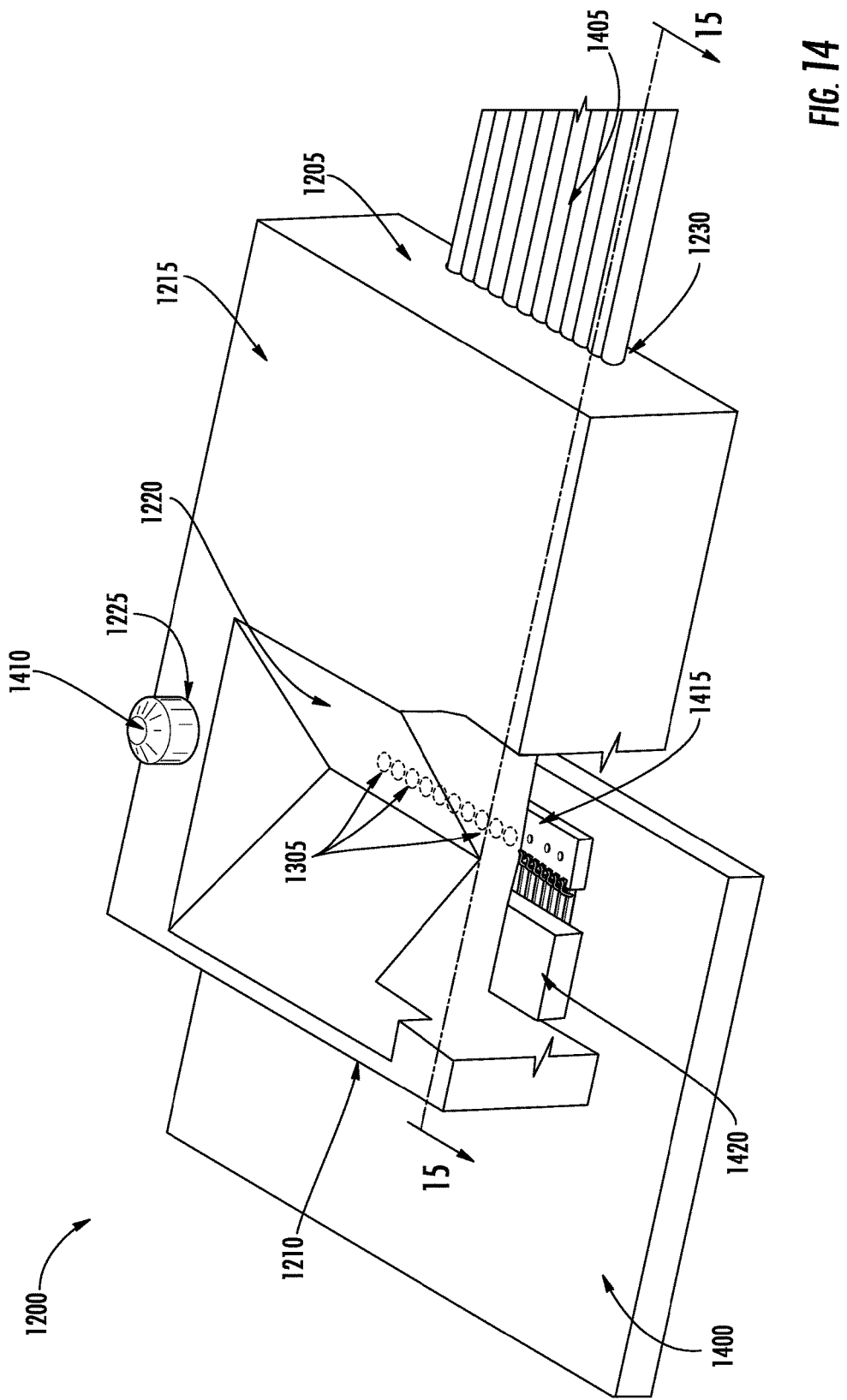
Figure 15:
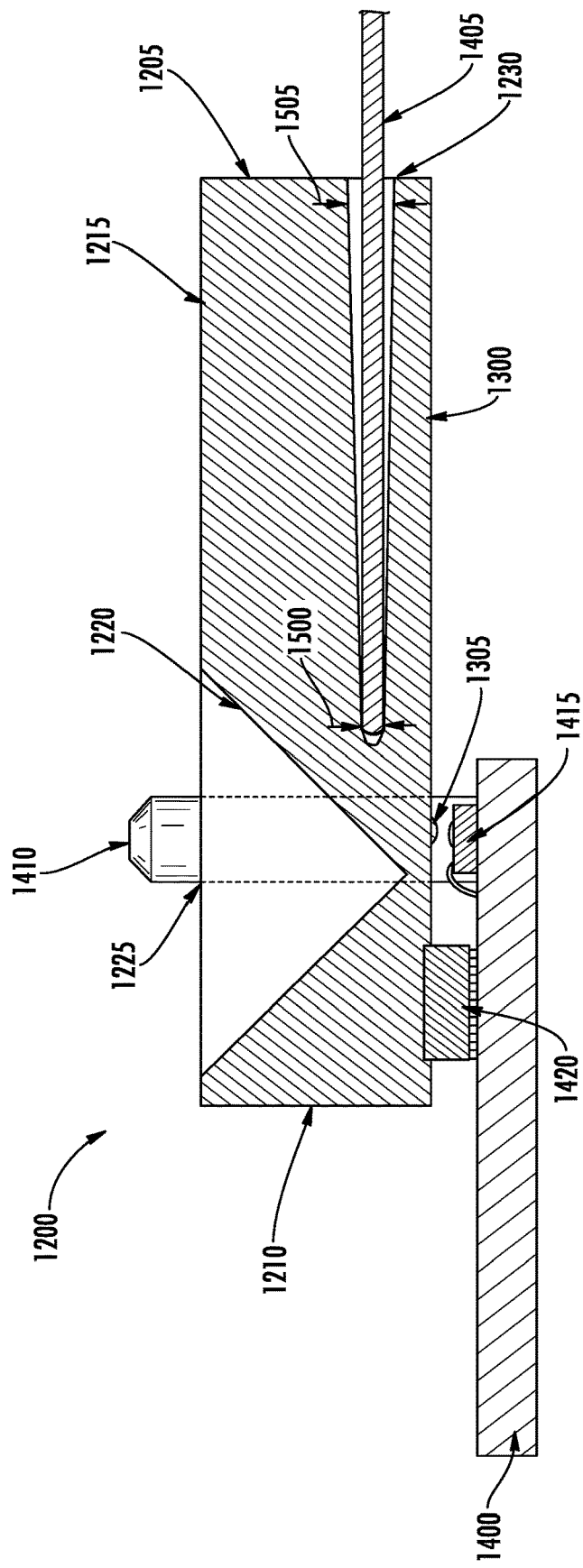
Figure 16:
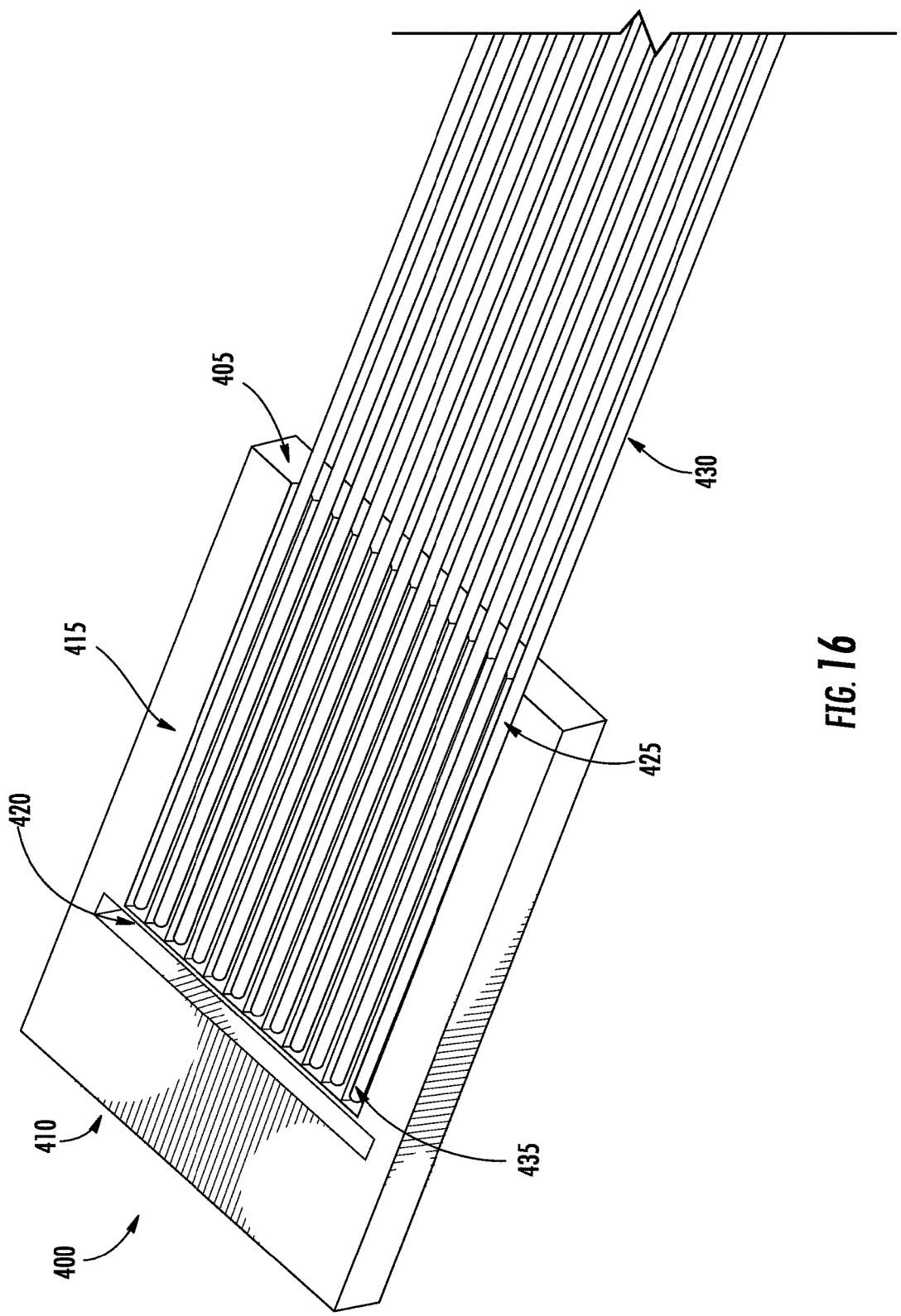
Figure 17:
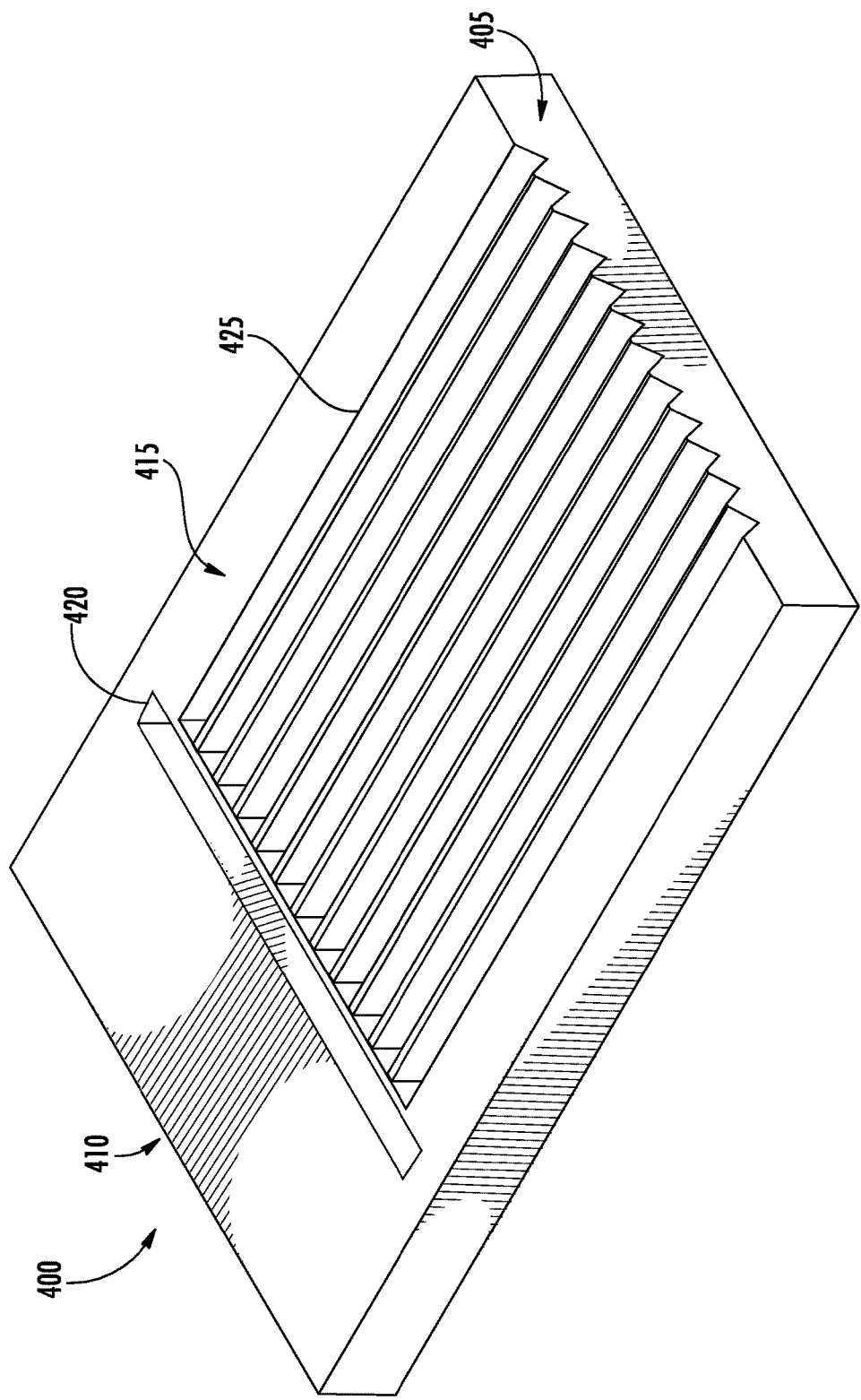
Figure 18:
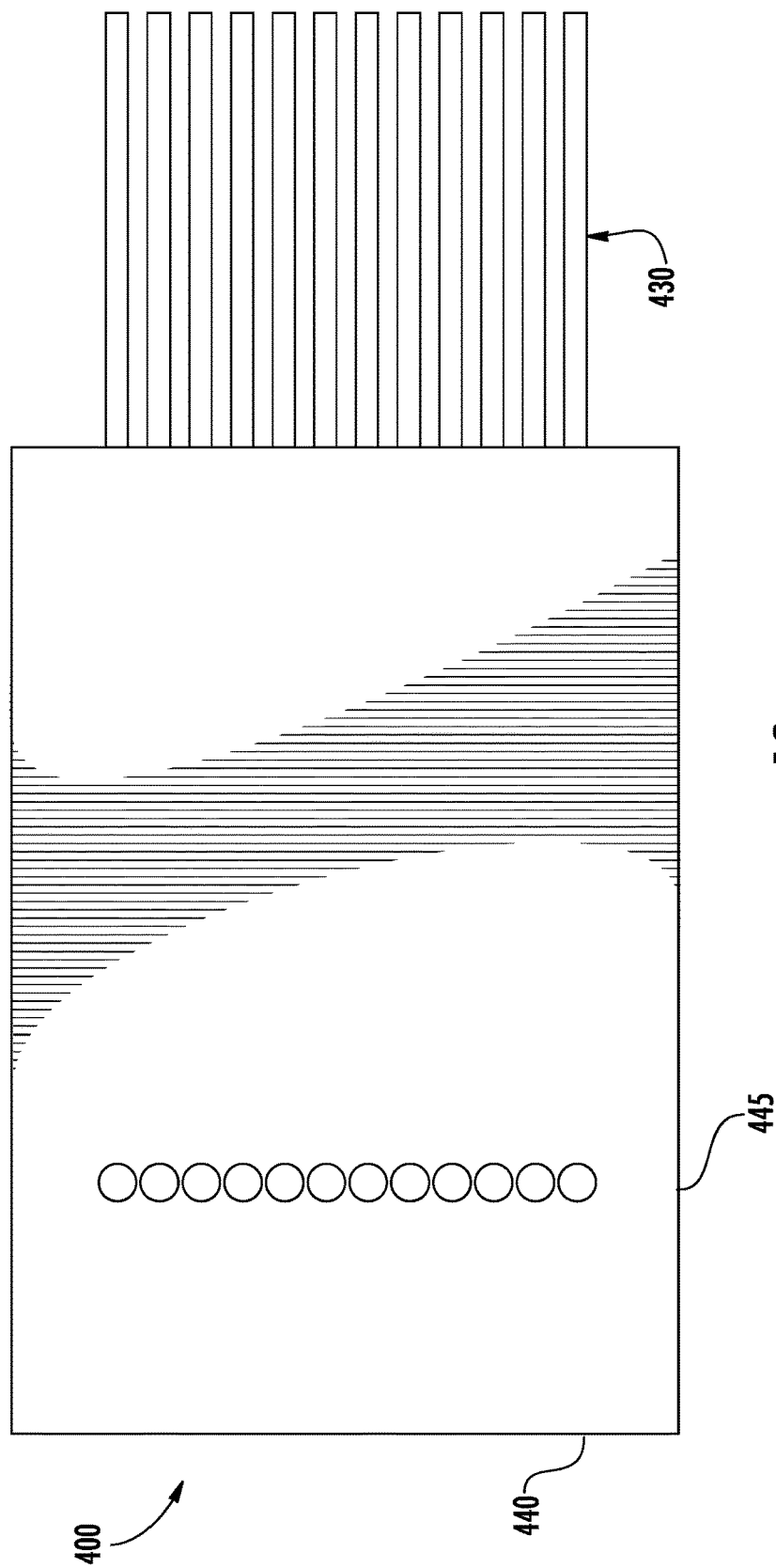
Figure 19:
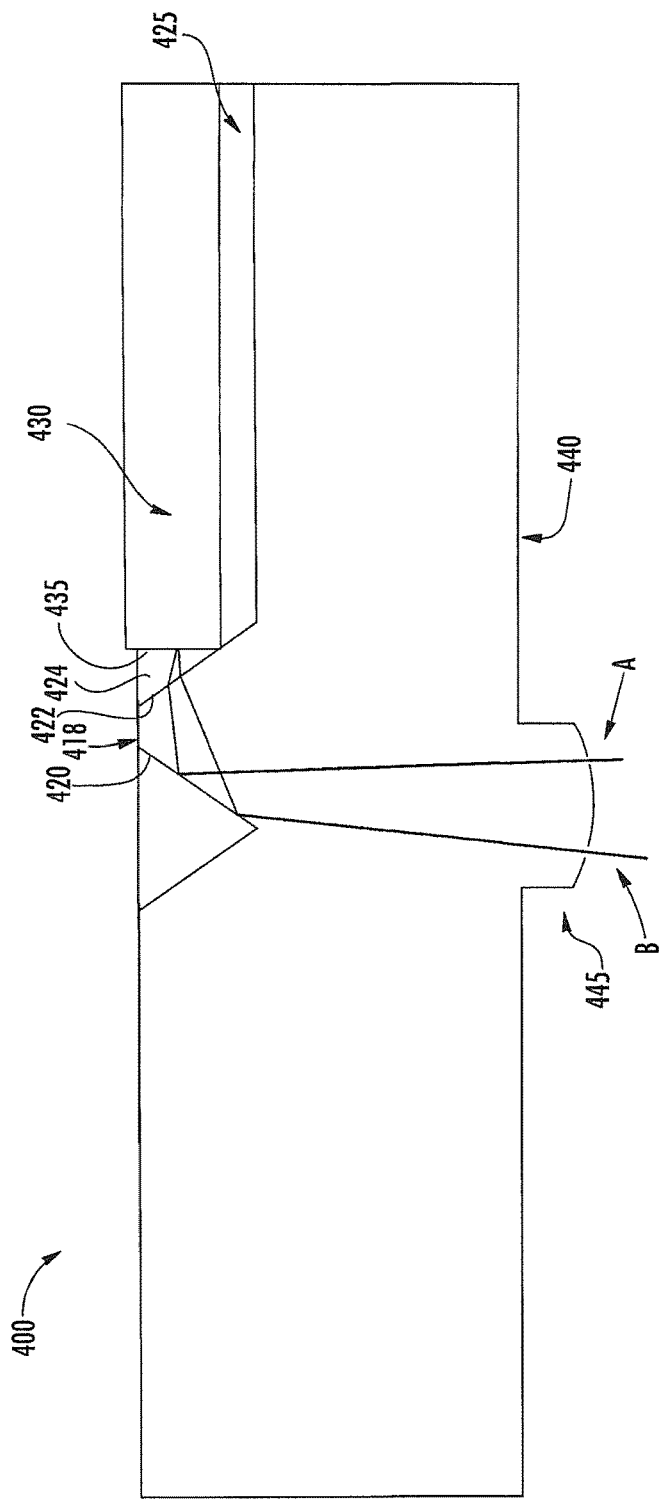

Having thus described the invention in general terms, reference will now be made to the accompanying drawings, which are not necessarily drawn to scale, and wherein:

FIG. 1 illustrates a perspective view of an opto-mechanical coupler, in accordance with some embodiments discussed herein;

FIG. 2 illustrates a top view of the opto-mechanical coupler of FIG. 1, in accordance with some embodiments discussed herein;

FIG. 3 illustrates a bottom view of the opto-mechanical coupler of FIG. 1, in accordance with some embodiments discussed herein;

FIG. 4 illustrates a perspective view of the opto-mechanical coupler of FIG. 1, in accordance with some embodiments discussed herein;

FIG. 5 illustrates a perspective view of the opto-mechanical coupler of FIG. 1 in conjunction with an optoelectronic transceiver system and optical fibers, with a portion of the coupler removed, in accordance with some embodiments discussed herein;

FIG. 6 illustrates a top view of the opto-mechanical coupler of FIG. 5 with a portion removed, in accordance with some embodiments discussed herein;

FIG. 7 illustrates a cross-sectional side view of the opto-mechanical coupler of FIG. 5, in accordance with some embodiments discussed herein;

FIG. 8 illustrates a perspective view of an opto-mechanical coupler, in accordance with some embodiments discussed herein;

FIG. 9 illustrates a top view of the opto-mechanical coupler of FIG. 8, in accordance with some embodiments discussed herein;

FIG. 10 illustrates a perspective view of the opto-mechanical coupler of FIG. 8 in conjunction with a transceiver system and optical fibers, with a portion of the coupler removed, in accordance with some embodiments discussed herein;

FIG. 11 illustrates a cross-sectional side view of the opto-mechanical coupler of FIG. 8 in conjunction with an optoelectronic transceiver system and optical fibers, in accordance with some embodiments discussed herein;

FIG. 12 illustrates a perspective view of an opto-mechanical coupler, in accordance with some embodiments discussed herein;

FIG. 13 illustrates a bottom view of the opto-mechanical coupler of FIG. 12, in accordance with some embodiments discussed herein;

FIG. 14 illustrates a perspective view of the opto-mechanical coupler of FIG. 12 in conjunction with an optoelectronic transceiver system and optical fibers, with a portion of the coupler removed, in accordance with some embodiments discussed herein;

FIG. 15 illustrates a cross-sectional side view of the opto-mechanical coupler of FIG. 12 in conjunction with a transceiver system and optical fibers, in accordance with some embodiments discussed herein;

FIG. 16 illustrates a perspective view of an opto-mechanical coupler, in accordance with some embodiments discussed herein;

FIG. 17 illustrates another perspective view of the opto-mechanical coupler of FIG. 16, in accordance with some embodiments discussed herein;

FIG. 18 illustrates a bottom view of the opto-mechanical coupler of FIG. 16, in accordance with some embodiments discussed herein; and FIG. 19 illustrates a cross-sectional view of the opto-mechanical coupler of FIG. 16, in accordance with some embodiments discussed herein.

DETAILED DESCRIPTION

Overview

Optical cables are comprised of optical fibers. Optical cables may be utilized in conjunction with optical transmitters and receivers built into transceiver modules and systems located at the ends of the optical cables for transmitting and receiving the optical communication signals carried by the fibers. The transceiver modules may include small form-factor pluggable (SFP) transceivers or dual SFP transceivers. The transceiver modules or systems may plug into suitable electrical communication ports, such as Gigabit Ethernet or InfiniBand® ports, of switching and computing equipment. Optoelectronic and opto-mechanical components in the transceiver modules and systems may convert the high-speed electrical signals output by the ports into optical signals for transmission over the fibers. In addition, these components may convert the optical signals received over the fibers into high-speed electrical signals for input to the ports.

In many transceiver modules and systems, laser diodes, such as VCSELs, are used to generate optical signals for transmission over optical fibers. VCSELs in particular are favored for their high bandwidth and efficiency. In some implementations, an array of such VCSELs is used to drive a corresponding array of optical fibers, which are joined together in a ribbon configuration. Optical fibers may be connected to both VCSELs and photodiode configurations on opposing ends such that one or more photodiodes may receive the light from the VCSELs and convert the incident light into electrical signals. One or more sources may provide the electrical signals for transmission from a transmitting device or receiving the electrical signals after receipt from the transmitting device, and each source may be associated with one or more VCSELs and/or photodiodes. The sources may provide electrical signals to the VCSELs, for transmission via optical fibers or may receive electrical signals received by the photodiodes via optical fibers.

In order to properly align optical fibers for receiving or transmitting optical signals, opto-mechanical couplers may be utilized. These couplers position the optical fibers such that the optical signals converted by laser diodes, such as VCSELs, properly enter the optical fibers in order to achieve effective transmission of the optical signals. opto-mechanical couplers may be utilized at both ends of an optical cable and facilitate positioning optical fibers for transmitting and receiving optical signals.

As noted above, POFs are often utilized for short distance applications and provide accurate signals when used in shorter distance applications than when utilized in long distance applications. POFs have a tighter bend radius and are more resilient due to the flexibility of the plastic or polymer utilized as the filament. Thus, POFs are often considered more user-friendly and are often easier to connect and install as compared to SMFs. POFs are often lighter in weight and cheaper than SMFs, but POFs are typically larger in diameter than SMFs. In contrast, SMFs are often used in long distance and high speed applications due to providing more accurate signals than POFs. SMFs are resistant to flexibility and accidental breakage due to their stiffness and are often more mechanically protected than POFs. Both POFs and SMFs have advantages often tailoring their utilization to specific applications.

Conventional opto-mechanical couplers and interfaces, however, are primarily designed to accommodate a single type or diameter of optical fiber in order to ensure proper optical interfacing between the transceiver system and the optical fiber. Traditionally, a new, separate transceiver was necessary when changing between optical fiber types, requiring large inventories of costly components and/or investment in new hardware.

Embodiments of the present invention that are described hereinbelow provide opto-mechanical couplers capable of interfacing with optical fibers of differing types, such as POFs and SMFs. The opto-mechanical coupler may be connected with one or more optical fibers, sometimes referred to as a ribbon, and a transceiver module or system. The optical fibers may operate as a medium by which optical signals may be transmitted over a specified distance. The transceiver module may convert received electrical signals into optical signals or optical signals into electrical signals, by way of one or more VCSELs or photodiodes, respectively. In some embodiments, the opto-mechanical coupler may have one or more reflective surfaces such that the path of the optical signals may be directed between the transceiver module and the optical fibers. Embodiments of the opto-mechanical coupler described herein may position and align one or more optical fibers in the proper location and direction to transmit or receive optical signals directed via the one or more reflective surfaces. In order to operate with both POFs and SMFs, the opto-mechanical coupler may utilize means hereinafter described.

In some embodiments, at least one end of the opto-mechanical coupler may be capable of receiving optical fibers of varying diameters, such as those common to POFs and SMFs, by utilizing a grooved surface. In such an embodiment, at least one end of the opto-mechanical coupler may include grooves in the surface for receiving optical fibers. These grooves may be configured such that a POF or SMF of a set diameter will be aligned to the proper height for receiving an optical signal for the respective fiber. In such an embodiment, two prisms in separate opto-mechanical couplers may be utilized. Each prism may be configured for use with a single type of fiber and may be configured such that the optical signals produced by the transceiver module may be directed to an aligned optical fiber.

In some embodiments, each end of the opto-mechanical coupler may be capable of receiving optical fibers of a specific diameter, such as those common to POFs and SMFs, by utilizing a grooved surface. For example, the first end may be configured to receive POFs, while the second end may be configured to receive SMFs. In such an embodiment, the appropriate side of the opto-mechanical coupler may be utilized depending on the optical fiber used in the application. If another type of optical fiber is needed in the application, the orientation of the opto-mechanical coupler may be reversed such that the opposite end is used to receive the optical fibers. In such an embodiment, two reflective surfaces may be used such that each reflective surface is configured to align the optical signals at a position appropriate for its respective fiber (e.g., POF or SMF).

In some embodiments, at least one end of the opto-mechanical coupler may be capable of receiving optical fibers of varying diameters, such as those common to POFs and SMFs, by utilizing a tapered aperture. In such an embodiment, at least one end of the opto-mechanical coupler may have an aperture for receiving optical fibers. This aperture may extend through the body of the opto-mechanical couple and may vary in diameter, with a smaller proximal diameter closest to the transceiver module or system, and a larger distal diameter farther from the transceiver module. In such an embodiment, optical fibers of varying diameters may only be inserted into the aperture a set distance until the aperture narrows to a diameter less than or equal to the diameter of the optical fiber. This aperture may be configured such that a POF or SMF of a set diameter may only be inserted into the aperture a set distance, with the aperture configured to align the fiber at the proper height for receiving an optical signal for the respective fiber.

For the sake of clarity and convenience of description, the embodiments that are described below refer to a particular optical cable configuration, using VCSELs as emitters and certain types of switching elements. The principles of the present invention, however, may similarly be implemented using other types of emitters and switching elements, as well as other optoelectronic transceiver components (e.g., photodiodes and differently configured optical cables and connector modules).

Coupling Mechanisms

With reference to FIG. 1, an opto-mechanical coupler according to one embodiment is illustrated. As shown in FIG. 1, an opto-mechanical coupler 100 may have a first end 105, a second end 110, a top surface 115, a bottom surface (bottom surface 300 in FIG. 3), a reflective surface 120, and a through-hole 125. As described in greater detail below, the first end 105 may be configured so that one or more optical fibers may be properly aligned with the reflective surface 120 to transmit or receive optical signals.

With continued reference to FIG. 1, the first end 105 may be configured to receive one or more optical fibers on a receiving surface. Optical fibers may be inserted into the opto-mechanical coupler 100 via the first end 105 such that an end of each fiber is disposed proximate the reflective surface 120. For example, the first end 105 of the opto-mechanical coupler may in some embodiments be grooved (e.g., channeled, ribbed, ridged, etc.) such that one or more optical fibers may be pressed down into the respective grooves of the opto-mechanical coupler 100 and thereby aligned with the reflective surface 120 to properly receive optical signals.

The reflective surface 120 may be configured to redirect optical signals such that the optical signals are aligned with the one or more optical fibers. In some embodiments, the reflective surface 120 may receive optical signals from at least one transceiver module or system. The transceiver module (shown as transceiver module 515 in FIGS. 5-7) may, for example, be configured to convert electrical signals into optical signals through the use of one or more VCSELs. The VCSELs may emit optical signals in a direction substantially perpendicular to the direction in which the one or more optical fibers may be oriented, as depicted in the figures. The reflective surface 120 may be configured to change a pathway of the optical signals, by reflecting the optical signals that are incident to the reflective surface 120, thereby redirecting them by a certain angle. In some embodiments, the reflective surface 120 may redirect optical signals such that they travel in a direction that is substantially perpendicular to the direction the optical signals are initially transmitted by the one or more VCSELs. In this regard, the reflective surface 120 may be comprised of any reflective material suitable for use in optoelectronics (e.g., prisms, mirrors, among others).

The transceiver module 515 may also be configured to convert optical signals into electrical signals through the use of one or more photodiodes. The photodiodes may receive optical signals from the one or more optical fibers. The reflective surface 120 may be configured to change a pathway of the optical signals, by reflecting the optical signals that are incident to the reflective surface 120, thereby redirecting them by a certain angle. In some embodiments, the reflective surface 120 may redirect optical signals such that they travel in a direction towards the photodiode(s) that is substantially perpendicular to the direction the optical signals are transmitted through the one or more optical fibers as a result of the reflective surface.

The top surface 115 and the bottom surface (bottom surface 300 shown in FIG. 3) of the opto-mechanical coupler 100 may define a through-hole 125. In order to ensure that the optical signals are properly positioned to align the one or more optical fibers with the optoelectronic transceiver modules, the opto-mechanical coupler 100 may be secured to a printed circuit board or substrate supporting the optoelectronic transceivers 515 such that the one or more optical fibers cannot move relative to the optoelectronic transceivers. For example, the through-hole 125 may be configured to receive a pin as a means for securing the opto-mechanical coupler 100. Although the depicted embodiment shows two through-holes 125 capable of receiving pins for securing the opto-mechanical coupler 100, the present disclosure contemplates any number of through-holes for receiving one, two, or more pins, and in other embodiments may include different means for securing an opto-mechanical coupler 100 (e.g., pins, snaps, or clamps, among others).

With reference to FIGS. 2-4, embodiments of the opto-mechanical coupler 100 may have a bottom surface 300 configured to support a plurality of optical lenses 200. In some embodiments, a plurality of transceiver modules may be positioned proximate the bottom surface 300 of the opto-mechanical coupler 100. In order for the optical signals to pass between the transceiver module or system and the one or more optical fibers for transmission, the optical lenses 200 supported by/within the bottom surface 300 may be configured to allow optical signals generated by the optoelectronic transceivers 515 (e.g., VCSELs) to pass through the bottom surface 300 and be directed to the reflective surface 120 for redirection to the core of an optical fiber 510. Likewise, optical signals traveling through the optical fiber 510 and hitting the reflective surface 120 may be redirected through the optical lenses 200 to reach the optoelectronic transceiver (e.g., a photodiode). In some cases, for example, the optical lenses 200 are embedded in the material of the opto-mechanical coupler 100, such as proximate the bottom surface 300.

With reference to FIGS. 5-7, an opto-mechanical coupler 100 according to one embodiment is depicted in conjunction with a substrate 500, two pins 505, optical fibers 510, a plurality of transceiver modules 515, and two drivers 520. A substrate 500 may be utilized in conjunction with pins 505 in some opto-mechanical coupler embodiments as a means for securing the opto-mechanical coupler 100 with respect to the optoelectronic transceiver 515 and the one or more optical fibers 510. As described above, one or more through-holes 125 may be configured to receive one or more pins 505 to secure the opto-mechanical coupler 100 from movement such that the one or more optical fibers 510 are properly aligned for transmitting or receiving optical signals. Conversely, in other embodiments, the pins 505 or similar fastening structures may form a part of the opto-mechanical coupler 100 (e.g., may be attached to the opto-mechanical coupler or extend from the opto-mechanical coupler, not shown) and may be received via openings defined the substrate 500 to which the opto-mechanical coupler 100 is mounted.

As depicted in FIGS. 5-7, one or more optical fibers may be positioned and aligned via grooves disposed through the first end 105. Although depicted with optical fibers of a certain diameter in FIG. 5-7, the present disclosure contemplates that the grooves defined by the first end 105 may be configured to accommodate optical fibers of any type and/or diameter, including POFs, SMFs, and MMFs, as would be understood by one or ordinary skill in the art in light of this disclosure. Additionally, the opto-mechanical coupler 100 may be configured to operate with optical signals transmitted through POFs at a nominal wavelength of 1310 nm and/or, alternatively, at nominal wavelengths of 850 nm and 1550 nm. Although described in conjunction with optical signals at a wavelength of 1310 nm, 850 nm, and/or 1550 nm, the present disclosure contemplates small variations in wavelength that are common to optical transmissions. The present disclosure contemplates utilizing optical signals at any wavelength as would be suitable for transmission via one or more POFs, SMFs, or MMFs.

One or more optical fibers 510 may be positioned via grooves disposed at the first end 105. The grooves may operate to align the core of the one or more optical fibers 510 to the correct height relative to the desired optical path of the optical signals with respect to the reflective surface 120. The grooves may, for example, have a v-shaped cross-section and extend partially through the body of the opto-mechanical coupler 100 to a distance proximate the reflective surface 120. The circular cross-section of the one or more optical fibers may rest in the grooves such that the core of the optical fiber is correctly aligned (e.g., positioned at the right height) with the desired optical path of the optical signals.

In some cases, different reflective surfaces 120 may be needed to accommodate optical fibers having different cross-sectional diameters. For example, an optical fiber with a larger diameter (e.g., a POF) may be aligned by the grooves of the first end 105 to a first height appropriate for directing an optical signal to or from a first reflective surface, while an optical fiber with a smaller diameter (e.g., an SMF) may be aligned by the grooves of the first end 105 to a second height appropriate for directing an optical signal to or from a second reflective surface. Because the heights differ when placed in the same groove configuration due to the different diameters of the optical fibers, two reflective surfaces (e.g., prisms) in separate opto-mechanical couplers 100 may be utilized, and the user may switch between the different opto-mechanical couplers 100 when switching between optical fiber types, such as by removing the pins of an installed opto-mechanical coupler and replacing it with a different opto-mechanical coupler via the pins.

The embodiment described above with reference to FIGS. 1-7 provides an opto-mechanical coupler 100 that is configured to accommodate a single type of fiber (e.g., a particular fiber diameter) corresponding to the size, shape, and positioning of the apertures (e.g., v-shaped grooves) of the first end 105 with respect to the position and orientation of the reflective surface 120 defined by the coupler body. Thus, when switching between different types of fibers (e.g., between SMF, MMF, and POF or between different fiber diameters), one opto-mechanical coupler 100 would need to be switched out with another, differently sized opto-mechanical coupler, as described above.

With reference to FIGS. 8-9, however, other embodiments provide an opto-mechanical coupler that is configured to accommodate two or more different types or diameter-size of fiber, eliminating the need to switch out couplers when changing between fibers. Rather, even when one set of fibers having a first diameter is switched out with a second set of fibers having a second, different diameter, the same opt-mechanical coupler may be used, with the coupler config- ured as described below such that regardless of the fiber diameter, the light from the source is automatically aligned with the core of the fiber by virtue of the configuration of the coupler as described below.

As shown in FIG. 8, an opto-mechanical coupler 800 according to one such embodiment may have a first end 805, a second end 810, a top surface 815, a bottom surface (bottom surface 860 in FIG. 11), two reflective surfaces 820, one or more through-holes 825, and a plurality of optical lenses 830 supported via the bottom of the coupler. As described in greater detail below, the first end 805 may be configured such that one or more optical fibers of one type may be properly aligned with a reflective surface 820 to transmit or receive optical signals, while the second end 810 may be configured so that one or more optical fibers of another type may be properly aligned with a reflective surface 820 to transmit or receive optical signals.

With continued reference to FIGS. 8-9, the opto-mechanical coupler 800 may have a first end 805 configured to receive one or more optical fibers of a first type or of a first diameter. The optical fibers of the first type/diameter may be inserted into the opto-mechanical coupler 800 through the first end 805 such that an end of each fiber is disposed proximate the reflective surface 820 configured for redirecting optical signals via one or more optical fibers of the first type. In some embodiments, the opto-mechanical coupler 800 may have a second end 810 configured to receive one or more optical fibers of a second type or of a second diameter. The optical fibers of the second type/diameter may be inserted into the opto-mechanical coupler 800 through the second end 810 such that an end of each fiber is disposed proximate the reflective surface 820 configured for redirecting optical signals via one or more optical fibers of a second type. By way of example, the first end 805 may be configured to align POFs, while the second end 810 may be configured to align SMFs. Depending on the type of optical fiber that is to be used, the user may install the opto-mechanical coupler such that the appropriate end is accessible and can be used to receive the optical fibers. If later a different type of optical fiber is desired, the opto-mechanical coupler 800 may be unsecured (e.g., by removing the pins as described above) and its orientation may be reversed to provide access to the other end. Likewise, if the same type of fiber (e.g., POF), but having a different fiber diameter, is desired (e.g., larger or smaller), the opto-mechanical coupler 800 may be reversed as described above to provide access to the other end, which may be sized to accommodate the different diameter. As still another example, one side of the opto-mechanical coupler 800 may be configured to accommodate SMF, while the other is configured to accommodate MMF. In this way, a single opto-mechanical coupler may be capable of accommodating optical fibers having different diameters.

As discussed above, in some embodiments, the opto-mechanical coupler 800 may have two reflective surfaces 820 each configured to align optical signals for transmission via one or more optical fibers of a certain type. By way of example, the reflective surface 820 positioned closest to the first end 805 may be configured (e.g., sized, shaped, positioned, etc.) to align optical signals for transmission via one or more POFs, while the reflective surface 820 closest to the second end 810 may be configured to align optical signals for transmission via one or more SMFs.

The top surface 815 and the bottom surface (bottom surface 860 in FIG. 11) may define one or more through-holes 825, as described above with reference to FIGS. 1-3. The opto-mechanical coupler 800 may have a bottom surface 860 configured to support a plurality of optical lenses 830. As described above with reference to FIGS. 2-4, a plurality of transceiver modules may be positioned proximate the bottom surface 860 of the opto-mechanical coupler 800, such that the optical signals can pass between the transceiver module or system and the respective reflective surface 820 via the optical lenses 830.

As depicted in FIGS. 10-11, one or more optical fibers may be received, secured, and aligned via the first end 805 or via the second end 810. Although depicted with optical fibers of a certain diameter in FIG. 10-11, the present disclosure contemplates that the first end 805 and second end 810 may be configured (e.g., sized and shaped) to accommodate optical fibers of any diameter, as would be understood by one or ordinary skill in the art in light of the present disclosure. By way of example, the first end 805 may be configured to receive POFs with a diameter of approximately 1 mm while the second end 810 may be configured to receive SMFs with a diameter of approximately 125 µm. Additionally, the opto-mechanical coupler 800 may be configured to operate with optical signals at a nominal wavelength of 1310 nm and/or, alternatively, at nominal wavelengths of 850 nm and 1550 nm. Although described in conjunction with optical signals at a wavelength of 1310 nm, 850 nm, and/or 1550 nm, the present disclosure contemplates that small variations in wavelength are common in optical transmissions. The present disclosure contemplates utilizing optical signals at any wavelength as would be suitable for transmission via one or more POFs, SMFs, or MMFs.

With reference to FIG. 12, an opto-mechanical coupler according to one embodiment is illustrated. As shown in FIG. 12, the opto-mechanical coupler 1200 may have a first end 1205, a second end 1210, a top surface 1215, a bottom surface 1300 (shown in FIG. 15), a reflective surface 1220, an aperture 1230, and a through-hole 1225. As described in greater detail below, the first end 1205 may define an aperture 1230 such that that one or more optical fibers may be properly aligned with the reflective surface 1220 to transmit or receive optical signals.

With continued reference to FIG. 12, the first end 1205 may be configured to receive one or more optical fibers. The optical fibers may be inserted into the opto-mechanical coupler 1200 through the first end 1205 such that an end of each fiber is disposed proximate the reflective surface 1220. The first end 1205 may define an aperture 1230 such that one or more optical fibers may be received by the opto-mechanical coupler 1200 and aligned with the reflective surface 1220 to properly transmit or receive optical signals. As shown in FIGS. 14-15, the aperture 1230 may extend through the body of the coupler, and the diameter of the aperture may vary, such that the aperture may have a smaller proximal diameter 1500 at a location closest to the reflective surface 1220 and a larger distal diameter 1505 at a location farther from the reflective surface 1220. In such an embodiment, an optical fiber may only be inserted into the aperture 1230 a set distance (e.g., through a predefined length of the aperture) until the aperture 1230 narrows to a diameter less than or equal to the diameter of the optical fiber. This aperture 1230 may be configured such that a POF or SMF of a set diameter may only be inserted into the aperture 1230 to a set distance; however, because the varying diameters of the aperture 1230 are concentric, fibers of any diameter will be secured by the aperture 1230 such that a central axis of the core of each type of fiber is at the proper height for communicating an optical signal via the same reflective surface 1220.

The top surface 1515 and the bottom surface (bottom surface 1300 in FIG. 13) may define one or more through-holes 1225, as described above with reference to FIGS. 1-3. The opto-mechanical coupler 1200 may have a bottom surface 1300 configured to support a plurality of optical lenses 1305. As described above with reference to FIGS. 2-4, a plurality of transceiver modules may be positioned proximate the bottom surface 1300 of the opto-mechanical coupler 1200, such that the optical signals can pass between the transceiver module or system and the respective reflective surface 1220 via the optical lenses 1305.

In some embodiments, the aperture 1230 may be configured to define a first distance proximate the first end, where the diameter of the aperture is constant along the first distance to limit the movement of the one or more optical fibers 1405 in all but the axial direction (e.g., direction of insertion), such as to facilitate insertion. In such an embodiment, the aperture may define a second distance closer to the reflective surface 1220 where the diameter of the aperture tapers from a larger distal diameter 1505 to a smaller proximal diameter 1500.

As depicted in FIGS. 12-15, one or more optical fibers may be received, secured, and aligned via the first end 1205 and aperture 1230. Although depicted with optical fibers of a certain diameter in FIG. 12-15, the present disclosure contemplates that the first end 1205 and aperture 1230 may be configured (e.g., sized and shaped) to accommodate optical fibers of any diameter, as would be understood by one of ordinary skill in the art in light of the present disclosure. Additionally, the opto-mechanical coupler 1200 may be configured to operate with optical signals at a nominal wavelength of 1310 nm and/or, alternatively, at nominal wavelengths of 850 nm and 1550 nm. Although described in conjunction with optical signals at a wavelength of 1310 nm, 850 nm, and/or 1550 nm, the present disclosure contemplates that small variations in wavelength may also be accommodated in accordance with acceptable tolerances in the field. Accordingly, the present disclosure contemplates utilizing optical signals at any wavelength as would be suitable for transmission via one or more POFs or SMFs.

Embodiments of a method of manufacturing opto-mechanical couplers, such as those described above, are also provided, where the method includes forming a body defining a first end, a second end, a bottom surface, a top surface, and a reflective surface, as described above. At least one aperture may be defined proximate the first end, wherein the aperture is configured to receive one or more optical fibers. A plurality of optical lenses may be supported via the bottom surface of the body, with the optical lenses configured to allow passage of optical signals traveling in a first direction for transmission to or from a plurality of optoelectronic transceivers disposed proximate the bottom surface. As described above, at least one through-hole may be defined extending between the top surface and the bottom surface, and the through-hole may be configured to receive a pin therethrough. The reflective surface may be configured to redirect the optical signals between the first direction and a second direction substantially perpendicular to the first direction. In this way, the coupler may be configured to position the one or more optical fibers along the second direction such that an optical signal from the plurality of optoelectronic transceivers is directed into the one or more optical fibers or an optical signal received from the one or more optical fibers is directed into the plurality of the optoelectronic transceivers.

In some cases, as described above, the apertures of the first end may comprise grooves configured to locate each optical fiber at a height relative to a first optical path in the second direction. The first end may be configured to receive via the apertures a first set of one or more optical fibers having a first diameter. In some embodiments, the method may further comprise defining additional apertures proximate the second end, where the additional apertures are configured to receive a second set of one or more optical fibers having a second diameter, as shown, for example, in FIG. 8. In this regard, the first diameter and the second diameter are not equal, such that fibers having different diameters may be received by a respective end and apertures of the coupler, as described above.

In some cases, the apertures of the first end may comprise grooves configured to locate each optical fiber at a height relative to a first optical path in the second direction, and the apertures of the second end may comprise grooves configured to locate each optical fiber at a second height relative to a second optical path in the second direction, wherein the first height and the second height are not equal. Each aperture of the first end may define a distal diameter and a proximal diameter, and the proximal diameter may be smaller than the distal diameter.

Accordingly, the one or more optical fibers may be plastic optical fibers or single mode (or multi-mode) optical fibers, and the coupler may be configured to receive optical signals having a nominal wavelength of 850 nm, 1310 nm, and/or 1550 nm.

High Accuracy Optical Fiber Coupler

In some instances, the coupler may be made of a cost-effective and simple-to-manufacture material, such as plastic and plastic-like compounds. In some embodiments, the coupler may be made of a more robust, accuracy-enhancing material, such as silicon or glass, where the processing with silicon or glass can provide surface features with sub-micron accuracies in relation to the nominal design. With reference to FIGS. 16-19, in some embodiments, the optical fibers 430 may be less tolerant to the variation or error caused by the standard fluctuations allowed in passive plastic coupler manufacturing. For example, single-mode fibers (SMF) have a small fiber core relative to plastic optical fibers (POF) or multi-mode fibers (MMF). The smaller fiber core may require more accurate optics to align the optical signals traveling through the coupler between the VCSEL or the detector and the optical fibers. The SMFs may be inoperable or suffer diminished performance when used with some conventional, plastic couplers, which may not align each of the optical fibers with each of the VCSELs or detectors with sufficient accuracy. Current solutions for SMFs require active alignment of the optical elements using ferrules and other adjustable fixing means; however, embodiments of the present, passive alignment system is configured to position the optical fibers automatically using the high accuracy couplers detailed herein.

With reference to FIG. 16, an embodiment of the coupler is shown that connects an SMF with a transceiver or detector. The coupler body 400 may include a first end 405, a second end 410, a top surface 415, and a bottom surface 440 (shown in FIG. 18). A portion of the top surface 415 may include a receiving surface 425 that receives a plurality of optical fibers 430. Reflective surfaces 420, such as on an angled prism 418 or mirror, may redirect optical signals between the ends 435 of the optical fibers and the transceiver or detector (not shown). In the embodiments shown in FIGS. 16-19, the receiving surface 425 includes grooves (e.g., v-shaped grooves) for passively holding and aligning the optical fibers 430 with the reflective surface 420.

The coupler 400 may include a reflective surface (e.g., an etch facet mirror) 420 for folding the optical signals (e.g., light) at approximately a right angle and embedded micro lenses 445 for focusing or collimating the optical signals toward a transceiver (e.g., light source) or detector as shown in FIGS. 1-15. With reference to FIG. 18, a bottom view of the coupler body 400 is shown having optical lenses 445 disposed in and supported by a bottom surface 440. The transceivers or detectors (not shown) may include optic elements for collimating or focusing the light. As detailed above with respect to FIGS. 1-15, a transceiver or detector may be positioned adjacent the lenses 445 to receive and/or transmit optical signals through the lenses and optical fibers 430. In some embodiments, alternative reflective surfaces and/or optical lenses may be used. For example, a folding curved reflective surface (e.g., a curved mirror or curved surface of a prism 418) may be used alone or in combination with an optical lens. A curved reflective surface may reflect and at least partially focus light. In some embodiments, the reflective surface 420 may be positioned at an angle of 54.7 degrees relative to the top surface 415 of the coupler body 400. In some further embodiments, the reflective surface 420 may be positioned in a prism 418 having a 54.7 degree slope to its reflective surface. With reference to FIG. 19, the reflective surface 420 may be positioned on a far surface of the prism 418, such that light travelling from the optical fiber 430 must first travel through a non-reflective surface 422 of the prism 418 before reflecting off of the reflective surface 420 within the prism. In some embodiments, both the reflective surface 420 and the non-reflective surface 422 may be angled at a slope of approximately 54.7 degrees, with the non-reflective surface and reflective surface angled in opposite directions as shown in FIG. 19 (e.g., 54.7 degrees measured from opposite sides of the respective angles, or supplementary angles of 125.3 degrees, respectively, when measured from the same side). One of ordinary skill in the art will appreciate that the non-reflective surface may be, but is not required to be, perfectly transparent.

The focusing lenses 445 may be either spherical or aspherical, and in some embodiments, the lenses may be associated with either a flat or curved reflective surface 420 along the optical path between the fiber 430 and the transceiver (not shown), with the reflective surface being positioned between the fiber and the respective lens. In each instance discussed herein, the light from or to the optical fiber 430 may be collimated (e.g., all of the light rays being substantially parallel, within normal tolerances) or focused (e.g., all of the light rays converging to a substantially single, focal point), within normal tolerances).

In some embodiments, the 54.7 degree angle may be unique to and created by the silicon manufacturing processes described herein. For example, an anisotropic wet KOH etching process, when performed on a silicon wafer, may generate a 54.7 degree reflective surface 420 and a 54.7 degree non-reflective surface 422 because of the crystal orientation in the silicon wafer.

In the embodiments shown in FIGS. 16-19, as well as the other embodiments discussed herein, the coupler body 400 may be made of a silicon or glass material. These materials may provide a rigid and accurate construction that allows the SMF to align properly with the transceiver or detectors when positioned on the receiving surface 425. For example, in some embodiments, the SMF may have an outer diameter of 125 micrometers and the alignment of the fiber may be within 1 to 3 micrometers using the etched silicon or glass discussed herein. One of ordinary skill in the art, in light of the present disclosure, will appreciate that although the silicon and glass designs are described herein as providing improved performance for SMF, the couplers may be configured for use with other fiber types (e.g., POF or MMF) or multi-fiber couplings (e.g., as shown in FIGS. 8-11).

In embodiments using a silicon body 400, a silicon wafer may be wet-etched to shape the body, including to create the v-shaped grooves 425, reflective surface 420 (e.g., a light-folding mirror), and/or lenses 445. Wet etching may include dipping a silicon wafer having one or more masks disposed thereon into a liquid solution to remove uncovered areas of the wafer. For example, anisotropic wet etching of silicon will chemically etch the silicon and the etching will stop according to a predefined pattern of photoresist and according to the silicon crystals plan. For example, the crystal plan of silicon may stop the etching of the prism 418 when each of the reflective surface 420 and non-reflective surface 422 are angled at opposite 54.7 degree angles. Isotropic wet etching will etch the silicon or glass uniformly in all directions and will not stop on crystal plan. The etchant may define the specific manner of etching. In some embodiments using the silicon body 400, a silicon wafer may be dry-etched to shape the body, including to create the v-shaped grooves 425 and reflective surface 420. Dry etching may include positioning a substrate in a heated vacuum chamber where a flow of gases and applied electric energy cause etching of the silicon. In some embodiments, combinations of wet and dry etching may be used. For example, in one embodiment, the grooves 425 and reflective surface 420 may be wet etched and the lenses 445 may be dry etched. In such embodiments, the grooves 425, reflective surface 420, and lenses 445 may be wet and dry etched, respectively, from the same silicon wafer. In some alternative embodiments, the lenses or other components may be added separately.

In embodiments using a glass body 400, a piece of glass may be laser scribed and etched to create the v-shaped grooves 425, reflective surface 420, and/or lenses 445. In some embodiments using the glass body 400, the glass may be scribed and etched to create a reflective surface 420 (e.g., a light-folding mirror) and microlenses 445. In some embodiments using the glass body 400, the glass may be scribed and etched to create a folding curved mirror. In embodiments using the glass body, the reflective surface 420 and/or non-reflective surface 422 may be angled at 54.7 degrees as discussed above. In some embodiments using a glass body, the reflective surface 420 and/or non-reflective surface 422 may be angled at 45 degrees. In each of the manufacturing processes described above, the body may have a generally uniform density based upon the density of the raw silicon or glass used in the process.

Turning to FIG. 19, a cross-sectional view of the body 400 of FIGS. 16-18 is shown representing the path of light through the coupler. When transmitting, light beams A, B enter the coupler in a first direction via lens 445 supported by the bottom surface 440. The light beams A, B then reflect off the reflective surface 420 such that the light is redirected towards a second, non-reflective surface 422 of the prism 418. The light may refract when passing through the non-reflective surface 422 and may enter the fiber 430 substantially perpendicular to the first direction in a second direction. As used herein, the term "substantially perpendicular" is used to reference the general entry and exit angles of the light beams that allows transmission between the upwardly-oriented lens and the horizontally-oriented optical fiber shown in FIG. 19. As shown in FIG. 19, both beam A and beam B may be considered substantially perpendicular to the optical fiber 430, and the light entering the optical fiber may be considered substantially perpendicular to the transmitted beams. The second direction aligns with and is parallel to the v-shaped grooves 425 and optical fibers 430. In some embodiments, the body 400, including features such as the reflective surface 420, non-reflective surface 422, and/or refractive material 424, may turn the light beams substantially perpendicularly between the transceiver and the optical fiber 430, and in some embodiments, the body 400 may turn the light beams 90 degrees between the transceiver and the optical fiber 430.

In some embodiments, a refractive material 424, such as an adhesive, may be positioned between the second, non-reflective surface 422 and the optical fiber 430 to compensate for any misalignment of the light beams. In embodiments in which the coupler 400 is attached to a detector or receiving device, the light beams would travel in the opposite direction. The refractive material 424 may include an index of refraction that is selected to align the light between the optical fiber and the transceiver. The refractive material 424 may be selected to account for a 54.7 degree angle of the reflective surface 420. In some embodiments, the refractive material 424 may be less dense than the silicon or glass body 400, and the refractive material may have an index of refraction less than that of the silicon or glass body. For example, in some embodiments, the refractive material 424 may have an index of refraction of 1.48. In some embodiments, the refractive material 424 may be organic.

The grooves 425 may passively hold the optical fibers 430 parallel to each other and aligned with the reflective surface 420, perpendicular to the direction of emission of the optical signals from the transceiver. Using opposingly angled surfaces, the v-shaped grooves may orient the optical fibers 430 in both lateral (e.g., left-to-right) and vertical (e.g., up-and-down) directions. The grooves 425 may thereby passively align the optical fibers 430 when the fibers are disposed on the receiving surface without requiring substantial optimization or tuning after the coupler body 400 has been etched.

Many modifications and other embodiments of the inventions set forth herein will come to mind to one skilled in the art to which these inventions pertain having the benefit of the teachings presented in the foregoing descriptions and the associated drawings. Although the figures only show certain components of the apparatus and systems described herein, it is understood that various other components may also be part of the opto-mechanical coupler and transceiver modules. Moreover, although the examples described herein refer primarily to an opto-mechanical coupler that can accommodate POF, MMF, and/or SMF, embodiments of the application may be used to accommodate a number of different types of fiber having different diameters, including POF, SMF, and MMF, among others, and embodiments of the invention described herein may be applied to various optoelectronic systems that use VCSELs, edge emitting lasers, edge emitting silicon photonics components, collimated VCSELs, LISELs, and other sources to emit light through the fiber optic cables. The silicon and glass couplers detailed herein may also be utilized for other optical fiber types, such as POF and MMF. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An opto-mechanical coupler comprising:
   a body defining:
   a bottom surface configured to allow passage of optical signals traveling in a first direction for transmission to or from a plurality of optoelectronic transceivers disposed proximate the bottom surface;
   a receiving surface configured to receive one or more optical fibers;
   wet-etched optical lenses integral to the body, wherein the wet-etched optical lenses are configured to allow passage of optical signals traveling in a first direction for transmission to or from a plurality of optoelectronic transceivers disposed proximate the bottom surface; and
   a wet-etched reflective surface created according to a crystal plan of a material of the body such that the reflective surface is integral to the body, wherein the wet-etched reflective surface is configured to redirect the optical signals between the first direction and the second direction,
   wherein the receiving surface is configured to position the one or more optical fibers along the second direction such that an optical signal from the plurality of optoelectronic transceivers is directed into the one or more optical fibers or an optical signal received from the one or more optical fibers is directed into the plurality of the optoelectronic transceivers, and
   wherein the receiving surface defines wet-etched grooves created according to a crystal plan of a material of the body and configured to precisely locate each optical fiber at a height relative to a first optical path in the second direction.

2. The opto-mechanical coupler according to claim 1, wherein the one or more optical fibers are single mode optical fibers.

3. The opto-mechanical coupler according to claim 1, wherein the grooves are v-shaped.

4. The opto-mechanical coupler according to claim 1, wherein the body is at least partially made of silicon.

5. The opto-mechanical coupler according to claim 4, wherein the at least the bottom surface, the reflective surface and the receiving surface are made of silicon.

6. The opto-mechanical coupler according to claim 4, wherein the body is formed by etching.

7. The opto-mechanical coupler according to claim 1, wherein the body is at least partially made of glass.

8. The opto-mechanical coupler according to claim 7, wherein the at least the bottom surface, the reflective surface and the receiving surface are made of glass.

9. The opto-mechanical coupler according to claim 7, wherein the body is formed by etching.

10. A method of manufacturing an opto-mechanical coupler comprising:
    forming a body defining a receiving surface, a bottom surface, and a reflective surface;
    wherein the bottom surface configured to allow passage of optical signals traveling in a first direction for transmission to or from a plurality of optoelectronic transceivers disposed proximate the bottom surface;
    wherein the receiving surface is configured to receive one or more optical fibers; and
    wherein defining the reflective surface comprises wet-etching the reflective surface according to a crystal plan of a material of the body such that the reflective surface is configured to redirect the optical signals between the first direction and the second direction,
    wherein the coupler is configured to position the one or more optical fibers along the second direction such that an optical signal from the plurality of optoelectronic transceivers is directed into the one or more optical fibers or an optical signal received from the one or more optical fibers is directed into the plurality of the optoelectronic transceivers,
    wherein defining the receiving surface comprises wet-etching the receiving surface according to a crystal plan of a material of the body to form one or more grooves configured to locate each optical fiber at a height relative to a first optical path in the second direction, and
    wherein forming the body further comprises forming a plurality of wet-etched optical lenses configured to allow passage of optical signals traveling in a first direction for transmission to or from a plurality of optoelectronic transceivers disposed proximate the bottom surface, wherein the bottom surface supports the plurality of wet-etched optical lenses.

11. The method according to claim 10, wherein the one or more optical fibers are single mode optical fibers.

12. The method according to claim 10, wherein the one or more grooves are v-shaped.

13. The method according to claim 10, wherein forming the body comprises forming the body from silicon.

14. The method according to claim 13, wherein the at least the bottom surface, the reflective surface and the receiving surface are formed of silicon.

15. The method according to claim 13, wherein forming the body comprises etching silicon to form the body.

16. The method according to claim 10, wherein forming the body comprises forming the body from glass.

17. The method according to claim 16, wherein the at least the bottom surface, the reflective surface and the receiving surface are formed of glass.

18. The method according to claim 16, wherein forming the body comprises etching glass to form the body.

* * * * *